(12) United States Patent
Mahalingam et al.

(10) Patent No.: US 12,538,231 B2
(45) Date of Patent: Jan. 27, 2026

(54) METHODS AND SYSTEMS FOR CHAINED AND OPPORTUNISTICALLY DELAYED WAKE-UP

(71) Applicant: INTERDIGITAL PATENT HOLDINGS, INC., Wilmington, DE (US)

(72) Inventors: Nagi Mahalingam, San Diego, CA (US); Ravikumar Pragada, Warrington, PA (US); Hussain Elkotby, Conshohocken, PA (US); Tanbir Haque, Jackson Heights, NY (US)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 364 days.

(21) Appl. No.: 18/276,076

(22) PCT Filed: Feb. 8, 2022

(86) PCT No.: PCT/US2022/015622
§ 371 (c)(1),
(2) Date: Aug. 7, 2023

(87) PCT Pub. No.: WO2022/170247
PCT Pub. Date: Aug. 11, 2022

(65) Prior Publication Data
US 2024/0147370 A1    May 2, 2024

Related U.S. Application Data

(60) Provisional application No. 63/147,035, filed on Feb. 8, 2021.

(51) Int. Cl.
*H04W 52/02* (2009.01)

(52) U.S. Cl.
CPC ... *H04W 52/0235* (2013.01); *H04W 52/0219* (2013.01); *H04W 52/0229* (2013.01)

(58) Field of Classification Search
CPC ............. H04L 5/0078; H04L 67/1051; H04W 36/0009; H04W 52/0216; H04B 17/328; H04B 7/269
See application file for complete search history.

(56) References Cited

U.S. PATENT DOCUMENTS

| 11,641,624 B2 * | 5/2023 | Lee ..................... H04W 40/244 370/318 |
| 2012/0190390 A1 * | 7/2012 | Reunamaki ....... H04W 52/0229 455/500 |
| 2023/0283491 A1 * | 9/2023 | Murali .................... H04L 12/12 370/338 |

OTHER PUBLICATIONS

Emmelmann, etal, "Opportunistic Scanning: Interruption-Free Network Topology Discovery for Wireless Mesh Networks" IEEE, 2009 (Year: 2009).*

(Continued)

*Primary Examiner* — Omer S Mian
(74) *Attorney, Agent, or Firm* — Volpe Koenig

(57) ABSTRACT

Methods and apparatuses are described herein for chained and delayed wake-up. For example, a station (STA) may determine, at the formation of a group of STAs, a common service period for the group. The STA may determine a deferral time for a first STA of the group. The deferral time may indicate when the first STA wakes up to receive a wake-up packet. The STA may receive, from an access point (AP), during a service period in which the STA acts as a head node for communication with the AP, a wake-up packet addressed to the first STA. The STA may transmit, based on a determination that the deferral time associated with the wake-up packet addressed to the first STA ends after the service period in which the STA acts as a head node, a (Continued)

wake-up command that includes the wake-up packet addressed to the first STA.

20 Claims, 27 Drawing Sheets

(56) References Cited

OTHER PUBLICATIONS

Pozza, et al, "Neighbor Discovery for Opportunistic Networking in Internet of Things Scenarios: A Survey", IEEE Access, 2015 (Year: 2015).*
Kumberga et al, "T-ROME: A Simple and Energy Efficient Tree Routing Protocol for Low-Power Wake-up Receivers", ARXIV, 2017 (Year: 2017).*
Ericsson, "Motivation for Rel-18 WI on Enhanced RedCap," 3GPP TSG RAN meeting #93e, RP-212424 (Sep. 13-17, 2021).
Ericsson, "Motivation for Rel-18 WI on Enhanced RedCap," 3GPP TSG RAN Rel-18 workshop, RWS-210313 (Jun. 28-Jul. 2, 2021).
Everactive, "On RedCap Enhancement in Rel-Supporting Battery-less Devices," 3GPP TSG RAN Rel-18 workshop, RWS-210085 (Jun. 28-Jul. 2, 2021).
Draft IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 3: Wake Up Radio Operation, IEEE P802.11ba/D8.0 (Dec. 2020).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 3: Wake Up Radio Operation, IEEE 802.11ba-2021 (Mar. 25, 2021).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

* cited by examiner

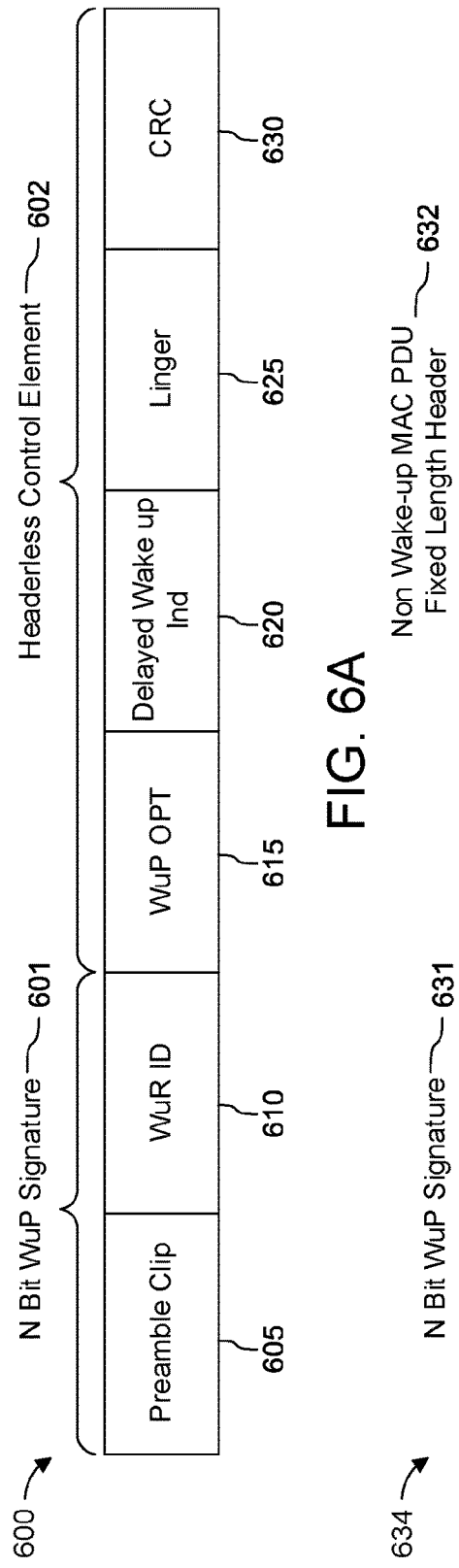
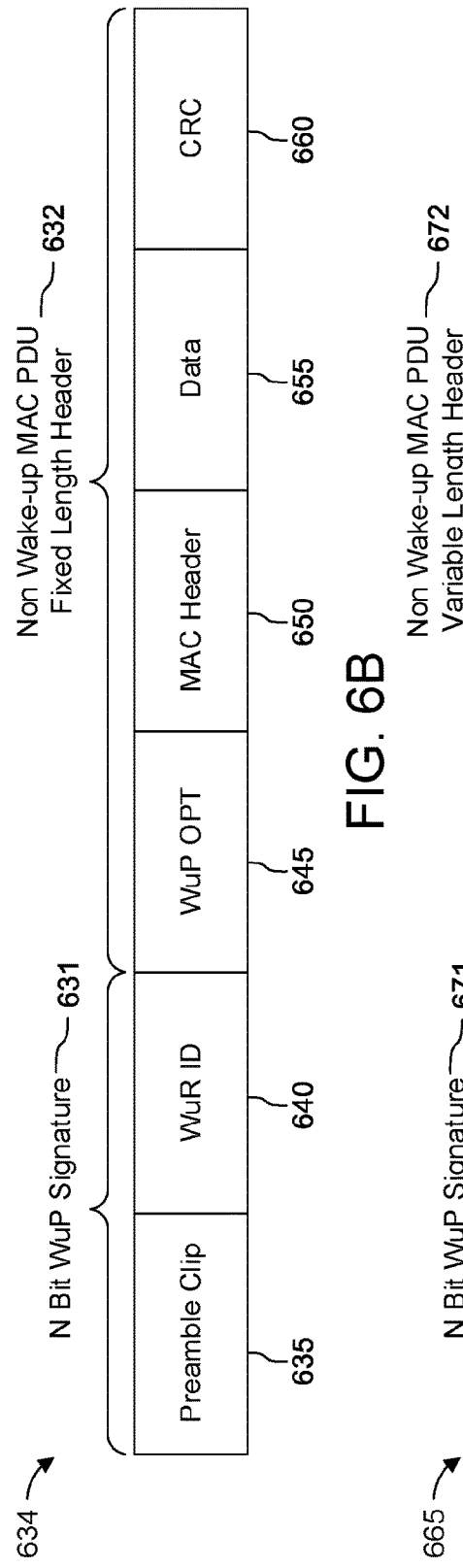
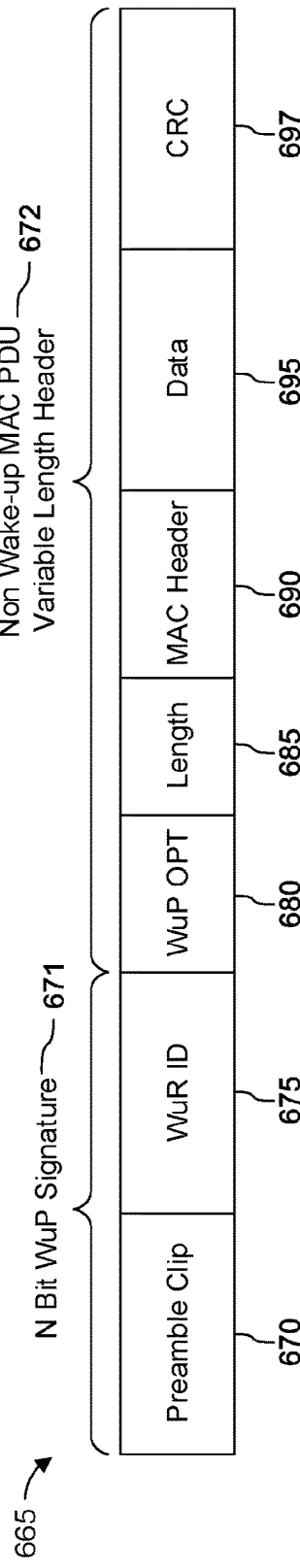

METHODS AND SYSTEMS FOR CHAINED AND OPPORTUNISTICALLY DELAYED WAKE-UP

CROSS-REFERENCE TO RELATED APPLICATIONS

This application is the U.S. National Stage, under 35 U.S.C. § 371, of International Application No. PCT/US2022/015622 filed Feb. 8, 2022, which claims the benefit of U.S. Provisional Application No. 63/147,035, filed Feb. 8, 2021, the contents of which are incorporated herein by reference.

BACKGROUND

In $3^{rd}$ Generation Partnership Project (3GPP), Discontinuous Reception (DRX) or Extended DRX (eDRX) are examples of the methods that enable the power save mode (PSM) mechanism. In IEEE 802.11, the 802.11ba principles of wake-up receiver is an example of methods specified for PSM. For example, a station (STA) incorporates a wake-up receiver to determine the presence of a wake-up packet. However, the wake-up receiver does not know that a wake-up packet is addressed to itself until it decodes medium access control (MAC) portion of the wake-up packet. For example, a STA decodes the identity of the wake-up receiver encoded within the MAC portion of the wake-up packet in order to decide the wake-up packet is addressed to itself. As the number of wake-up receivers increases, the number of unnecessary wake-up packets that need to be decoded increases. This increase in wake-up packet decodes decreases the battery standby time of the STA. Thus, methods and apparatuses that enable only one or a subset of STAs to wake up are needed.

SUMMARY

Methods and apparatuses are described herein for chained and delayed wake-up. For example, a station (STA) may determine, at the formation of a group of STAs, a common service period for the group of STAs. The common service period may be a collection of service periods. Each service period in the collection of service periods may be associated with a respective STA that acts as a head node for communication with the AP on behalf of other STAs of the group of STAs. The STA may determine a deferral time for a first STA of the group of STAs. The deferral time may indicate when the first STA wakes up to receive a wake-up packet or when the wake-up packet is forwarded to the second STA. The STA may determine the deferral time based on energy harvesting information of the first STA, such as energy harvesting state, energy harvesting capability, energy drain rate or the like. The STA may receive, from an access point (AP), during a service period in which the STA acts as a head node for communication with the AP on behalf of other STAs of the group of STAs, a wake-up packet addressed to the first STA. Based on a determination that the deferral time associated with the wake-up packet addressed to the first STA ends after the service period in which the STA acts as a head node, the STA may transmit or backscatter, to a second STA of the group of STAs, a wake-up command that includes the wake-up packet addressed to the first STA. The chained wake-up command may be transmitted or backscattered, based on the common service period, to the second STA, to enable the second STA to deliver the wake-up packet to the first STA after the deferral time.

BRIEF DESCRIPTION OF THE DRAWINGS

A more detailed understanding may be had from the following description, given by way of example in conjunction with the accompanying drawings, wherein like reference numerals in the figures indicate like elements, and wherein:

FIG. 6A is a diagram illustrating an example wake-up packet (WuP) type;

FIG. 6B is a diagram illustrating another example wake-up packet (WuP) type;

FIG. 6C is a diagram illustrating another example wake-up packet (WuP) type;

DETAILED DESCRIPTION

Figure 1A:
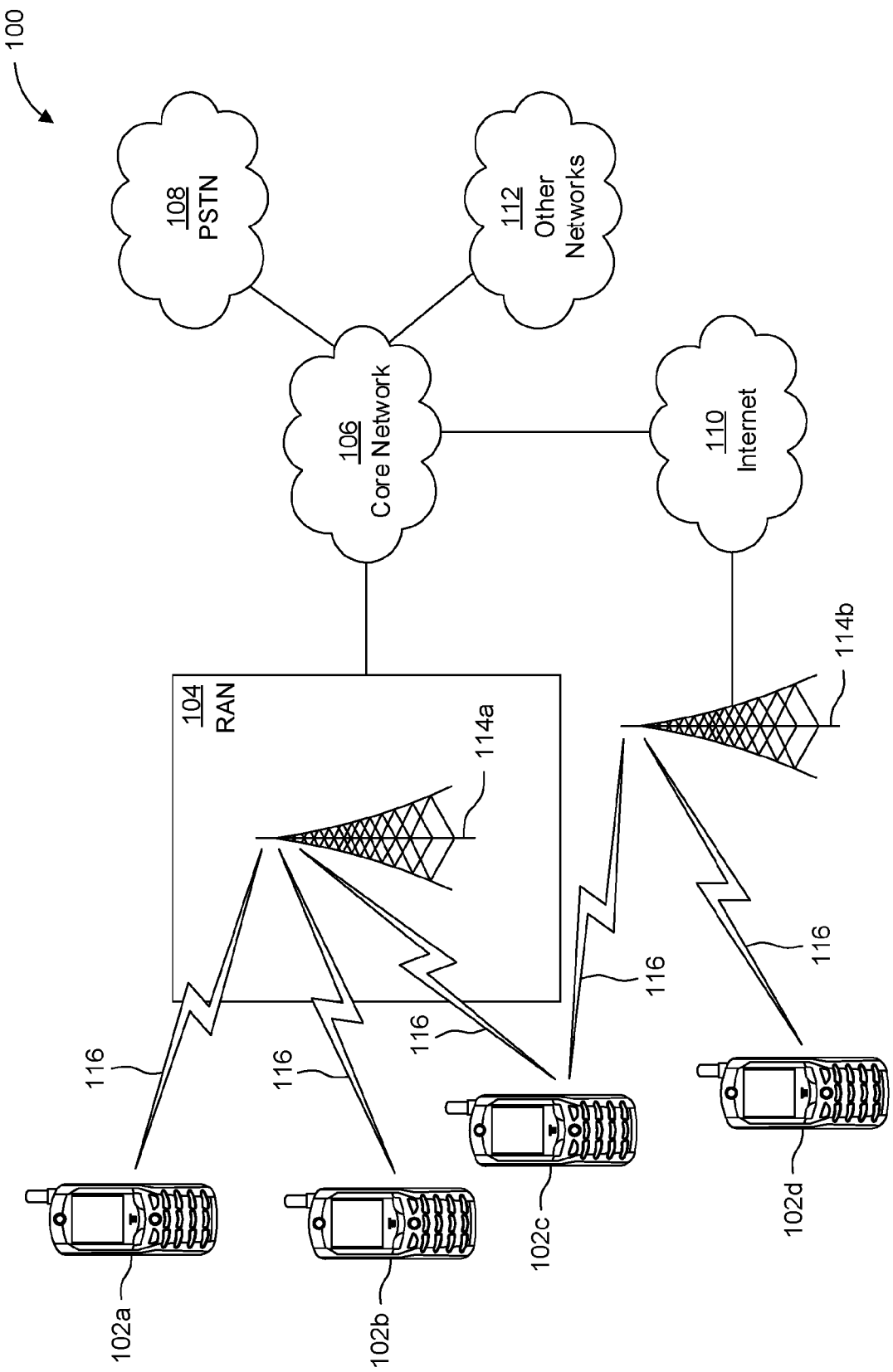
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
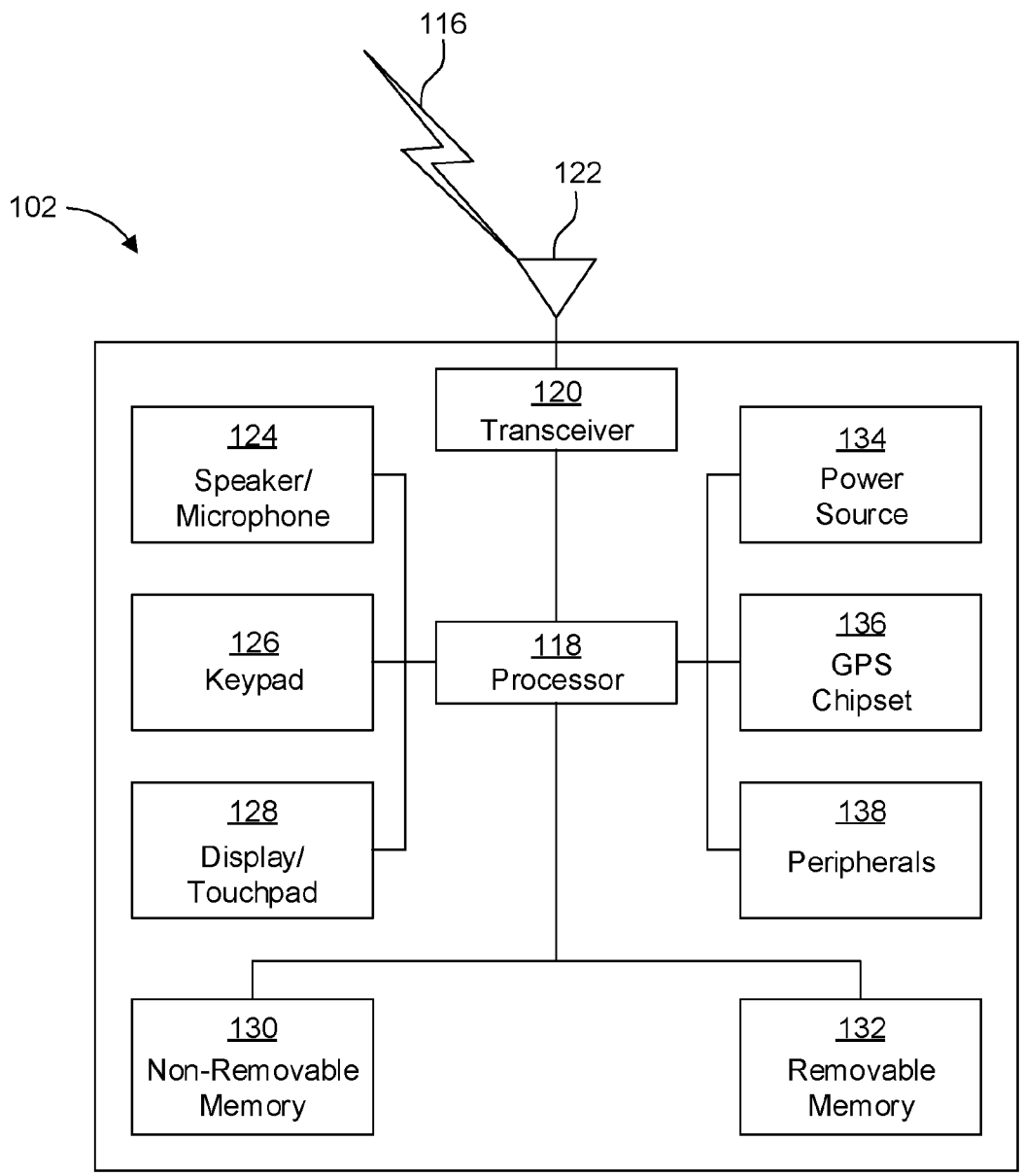
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
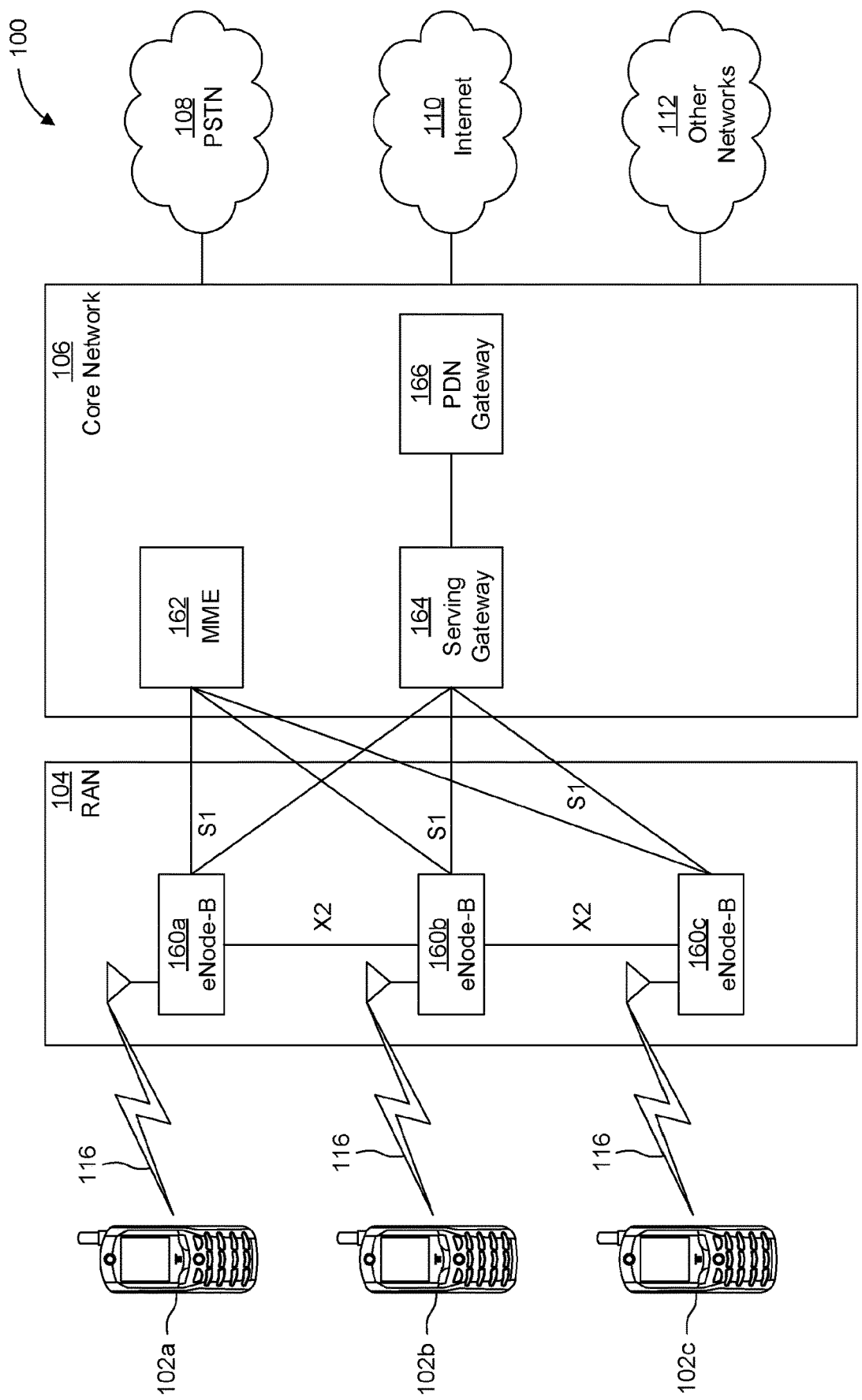
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
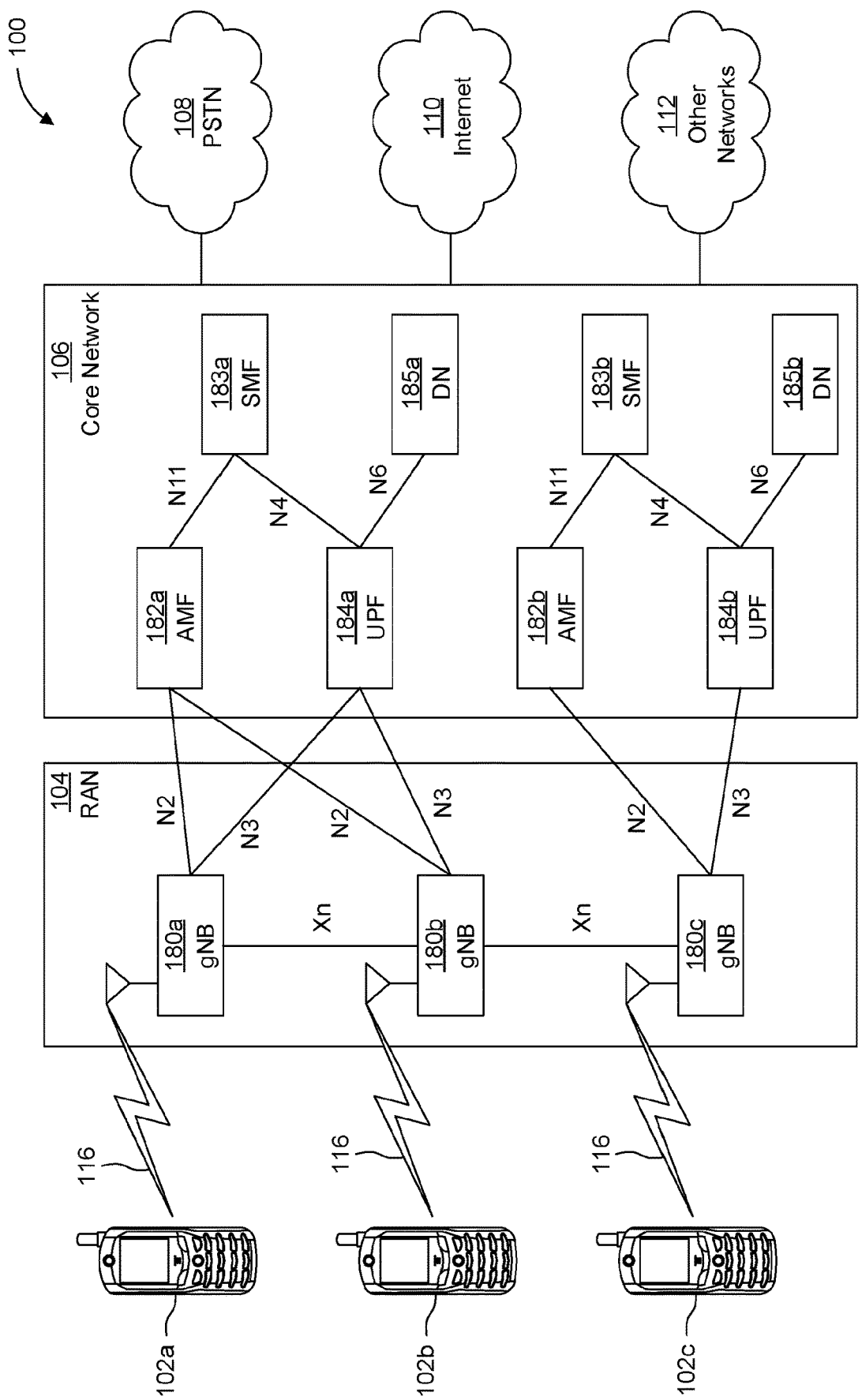
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

In wireless systems that are powered by a finite source of energy, power savings is of paramount importance. The stations connected to an access point (AP) are often configured to enter power savings mode and they sleep for sufficiently long durations of time and wake up at predetermined intervals (e.g., either periodic or event triggered). The transmissions and receptions on the wireless link between a mobile station (e.g., STA) and an access point (AP) can only be initiated when the devices are during the active/awake time slots within a sleep cycle. This methodology has several limitations and pitfalls, a few of them listed here: (1) increases the latency in system access of the communications devices for device/STA terminated services, (2) inability to reach the peer destination when the nature of communication is urgent or emergent, (3) indeterministic methodologies of establishing tradeoffs between power savings & tolerable latencies and (4) storage demand at APs for buffering data for several end-user devices.

When an end-user device enters active or awake mode within a sleep cycle, the AP may page the device for service. The page indicates whether the end-user device has data buffered at the AP and the end-user device can begin requesting delivery of pending data in buffers. In situations where multiple devices need to be woken up or require paging simultaneously (or) in succession, delays incurred in waking up the devices is expensive. In addition to this, 802.11 systems are carrier-sense multiple success (CSMA) systems and there is an additional overhead before system access.

Both IEEE and 3GPP have a notion of power-save-mode (PSM) for the end-user devices (e.g., STA, UE, WTRU) that acquire services from an AP or a base station (BS) (e.g., NodeB (NB)). The nominal procedure in PSM may involve several steps. For example, in the first step, the end-user devices negotiate, with the AP or BS (e.g., NB), a sleep cycle. The end-user devices then wake up as per pre-negotiated periodicities (or event occurrences). The end-user devices receive an indication of buffered data for reception or transmission upon entering the wake period. The end-user devices perform data transmission or data reception during the wake periods and resume PSM when there is lull in data transmission or reception. To this effect, a cyclic, finite but long duration of time can be considered a wake-up cycle and a portion within that cycle can be considered the "wake period" of the end-user device. When a device is woken up, the duration within the wake-up cycle when the device is active would depend on the amount of data pending in queues for reception or transmission. Theoretically, once awake, the end-user device may remain active through the entire duration of the wake-up cycle. If during the wake period there is no indication of pending data for reception/transmission, the end-user device may resume the sleep at the end of the wake period.

The foremost reason behind PSM is energy conservation. The longer a device can sleep, the longer the standby time of the power source of the end-user device. The end-user device that wakes-up periodically may mandatorily do so even though there may be nothing to communicate (i.e., towards the end-user device). In other words, the device may wake up for the express purpose of determining whether it has data to receive and the mere act of engaging its receiver results in power consumption, albeit a small amount. The identity of the end-user device to which data is destined may be indicated by the AP or BS (e.g., NB) on the wake-up packet. In IEEE 802.11ba, the end-user device needs to detect the wake-up packet and decode the protocol contents to determine whether a wake-up command is addressed to it specifically. The identity of the end-user device may be encoded within the MAC payload. Thus, the end-user device may first detect the presence of a valid PHY PDU, decode the entire MAC packet secondly (e.g., validate the FCS) and then confirm the presence of its identity in the wake-up packet.

In 3GPP, DRX, eDRX are examples that enable the PSM mechanism. In IEEE 802.11, the 802.11ba principles of wake-up receiver is an example specified for PSM. As mentioned earlier, the foremost reason behind PSM is energy conservation. The longer a device can sleep, the longer the standby time of the power source of the end-user device. However, the longer the device is made to sleep, the larger the resultant latency in enabling reception/transmissions. To minimize or avoid the latency, receivers needs to stay awake most of the time. The orthogonal requirements of minimizing latency in end-user reachability and maximizing power savings require methods and apparatus that: (1) develop zero-energy or negligible energy wake-up receivers; and (2) enable waking up end-user devices on demand.

Figure 2:
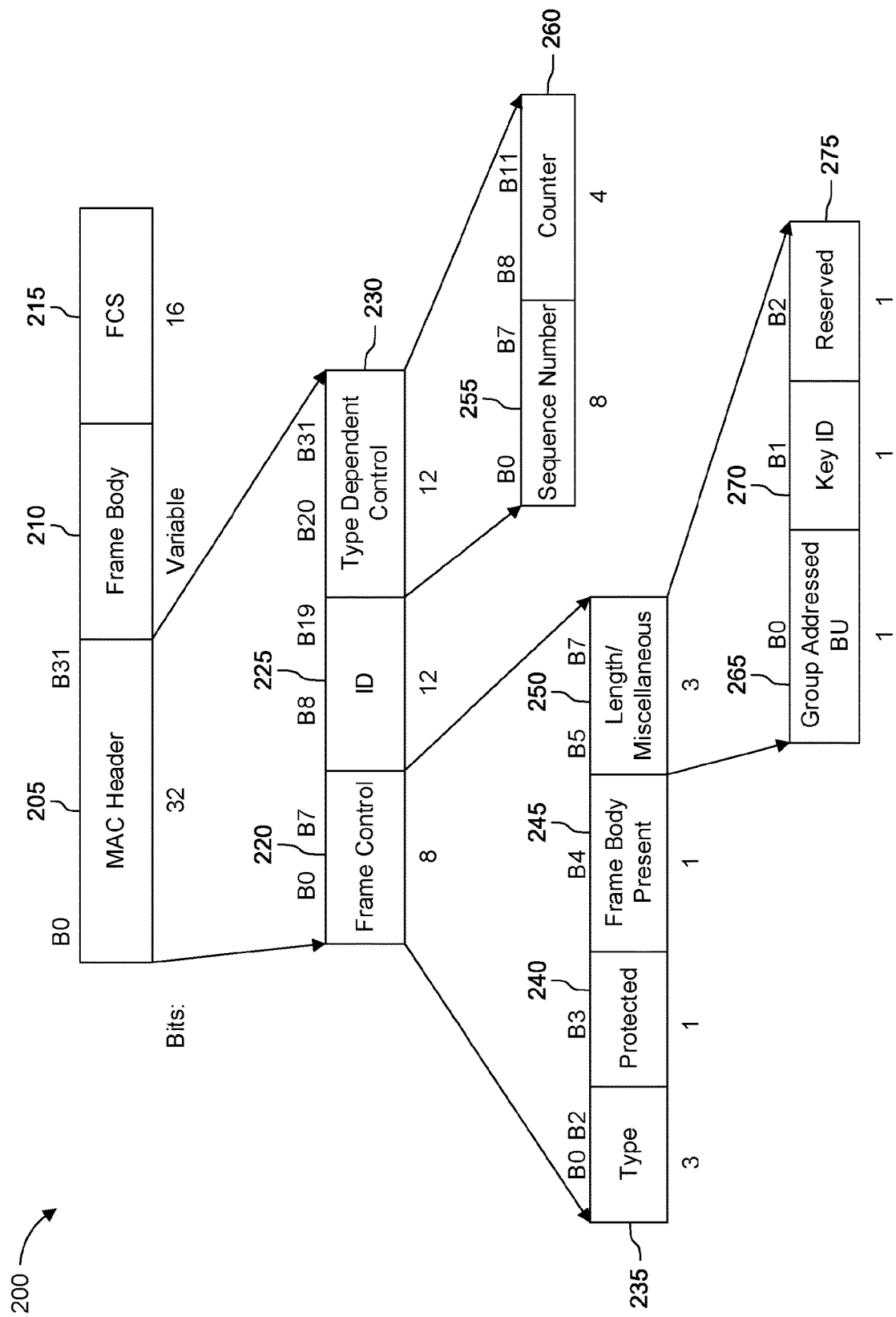
FIG. 2 is a diagram illustrating an example Medium Access Control (MAC) protocol data unit (MPDU) format of a wake-up packet (WuP) or a wake-up frame.

FIG. 2 is a diagram illustrating an example Medium Access Control (MAC) protocol data unit (MPDU) format 200 of a wake-up packet or wake-up frame, which may be used in combination with any of other embodiments described herein. As illustrated in FIG. 2, the MPDU 200 of a wake-up packet may comprise a MAC header 205, a frame body 210, and a frame check sequence (FCS) 215. The MAC header 205 may include a frame control field 220, an ID field 225, and a type dependent control field 230. The frame control field 220 may include a type subfield 235, a protected subfield 240, a frame body present subfield 245, and a length/miscellaneous subfield 250. The length/miscellaneous subfield 250 may include a group addressed BU subfield 265, a key ID subfield 270, and a reserved subfield 275. The type dependent control field 230 may include a sequence number subfield 255 and a counter subfield 260. As used herein, the terms wake-up packet (WuP), wake-up frame, and wake-up signal may be used interchangeably throughout this disclosure.

Figure 3:
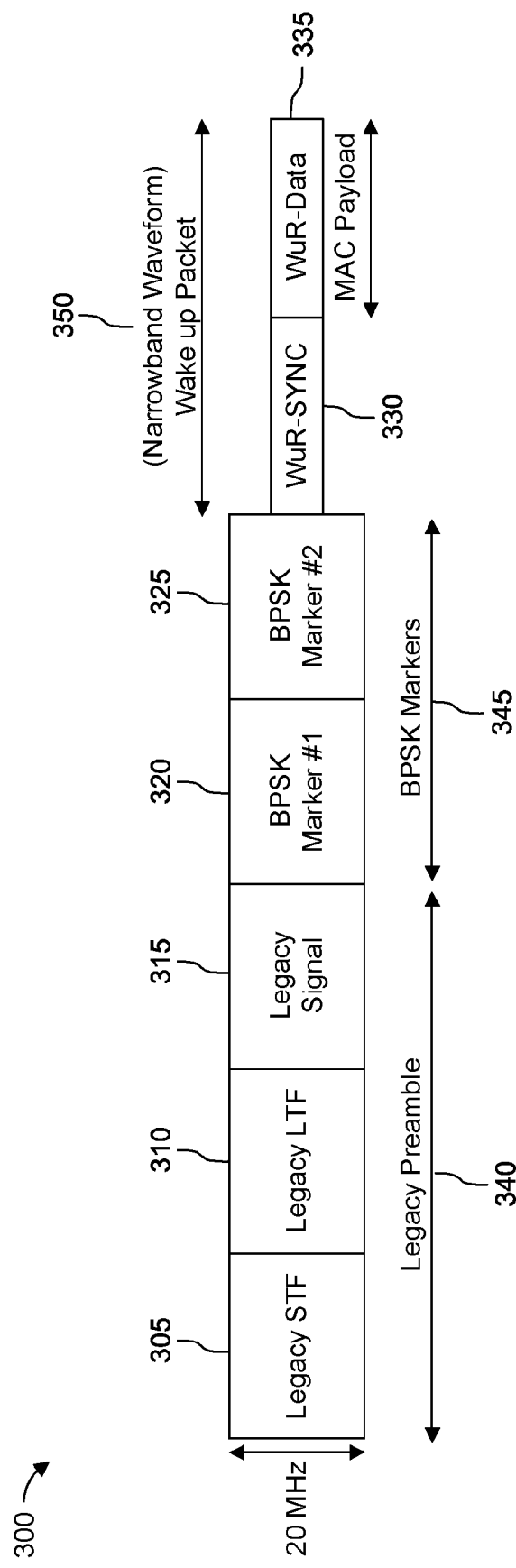
FIG. 3 is a diagram illustrating an example Physical Layer Convergence Protocol (PLOP) protocol data unit (PPDU) format of a wake-up packet (WuP) or a wake-up frame.

FIG. 3 is a diagram illustrating an example Physical Layer Convergence Protocol (PLCP) protocol data unit (PPDU) format 300 of a wake-up packet (WuP) or a wake-up frame, which may be used in combination with any of other embodiments described herein. As described in FIG. 3, the PPDU 300 may comprise a legacy preamble 340, BPSK markers 345, and wake-up packet (WuP) 350. Specifically, the PPDU 300 may comprise a legacy short-training field (L-STF) 305, a legacy long-training field (L-LTF) 310, a legacy signal field (L-SIG) 315, binary phase-shift keying (BPSK) marker #1 320, BSPK marker #2 325, a synchronization (or WuR-SYNC) field 330, and a data (or WuR-Data) field 335. A STA may perform the wake-up operation using the MPDU format 200 or the MAC frame illustrated in FIG. 2. The WuR-Data that may include the MAC payload, MAC frame or the MPDU 200 illustrated in FIG. 2 may follow the 802.11 legacy PHY-PDU format and the 802.11ba PHY preamble that facilitates synchronization as illustrated in FIG. 3.

The legacy portion 340 of the wake-up packet may enable all legacy devices to decode the presence of the 802.11 conformant PHY PDU and subsequently ignore the contents for the entire duration as indicated within the duration element of the L-SIG field 315. This method may enable coexistence of 802.11ba receivers with legacy 802.11 waveforms. The wake-up of STAs may be performed periodically and availability of buffered data at an AP may be indicated by identities of receivers in information maps and sent at specific time periods.

The STAs in power save mode may wake up at designated time slots and look for the presence of indication maps on the media access. In order to perform the wake-up, the STAs needs to fully wake-up at the designated intervals and decode the entire MAC frame (inclusive of validating FCS/CRC) before determining if it is an addressee. There may be latency in the wake-up process since the AP needs to wait until the designated time slots. The information maps are briefly described below.

Examples of Traffic Indication Maps (TIM) and Delivery Traffic Indication Map (DTIM) for 802.11 are described herein.

In 802.11, Traffic Indication Maps (TIM) and Delivery Traffic Indication Map (DTIM) may be used to indicate pending data to one or more associated end-user stations (e.g., STA, UE, or WTRU). TIM and DTIM are information elements and not information fields in that information elements may be fixed-length mandatory fields in the body of a management frame whereas Information fields may be variable in length and optional.

Figure 4:
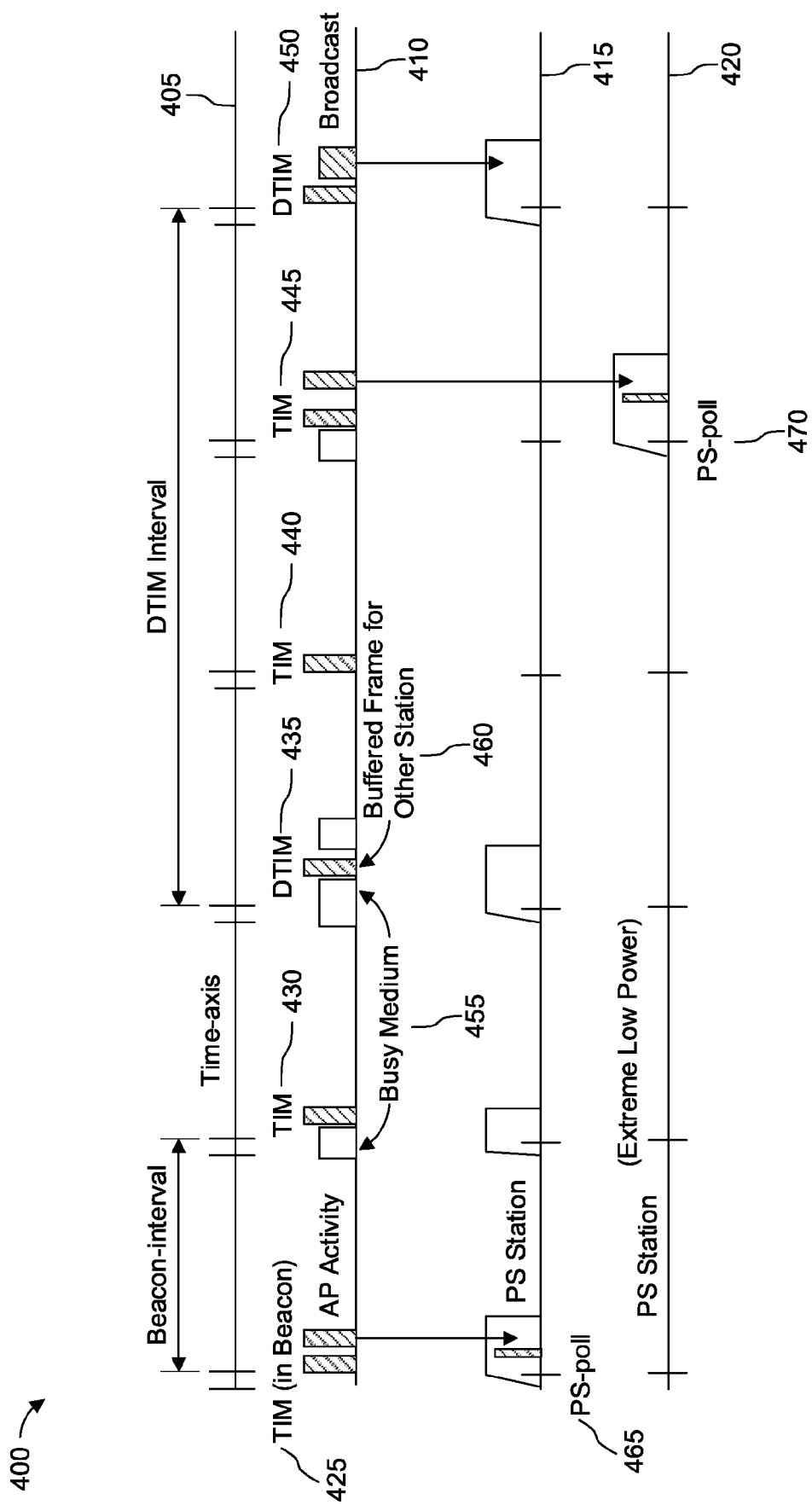
FIG. 4 is a diagram illustrating an example power management operation.

FIG. 4 is a diagram illustrating an example power management operation 400, which may be used in combination with any of other embodiments described herein. The two different TIM types distinguished here are TIM 425, 430, 440, 445 and DTIM 435, 450. After a DTIM 435, the AP may transmit buffered "group addressed" frames 460 before transmitting any individually addressed frames. The AP may transmit a TIM 425, 430, 440, or 445 with every Beacon frame. Every dot11DTIMPeriod, a TIM of type DTIM 435 or 450 may be transmitted within a Beacon frame in lieu of an ordinary TIM 425, 430, 440, or 450. FIG. 4 illustrates an example scenario of an AP and STA activity under the assumptions that point coordination function (PCF) is not operative and that a DTIM 435 or 450 is transmitted once every three TIMs 425, 430 or 440, 445. The line 405 in FIG. 4 represents time with the beacon interval shown together with a DTIM Interval of three beacon intervals. The line 410 in FIG. 4 shows AP activity. The lines 415, 420 in FIG. 4 describes STAs' activities. The AP may schedule beacon frames for transmission every beacon interval, but the beacon frames may be delayed if there is traffic at the TBTT. This may be indicated as busy medium 455 on the line 410. It is noted that beacon frames may include TIMs 425, 430, 440, 445, some of which are DTIMs 435, 450. It is noted that the second STA with ReceiveDTIMs equal to false does not power-on its receiver for all DTIMs 435, 450. It is because of the schedule indicated to the second STA on the possible page timing prearranged between the AP and itself. In response to the beacon frames with TIMs 425, 445, STAs may transmit PS-Poll frames 465, 470 to the AP to request data from the AP.

As noted earlier, TIM may be included in a management frame such as a beacon. For example, a beacon may be triggered by default on an AP every 102 us although this can differ in some implementations. The beacon may be a network advertisement helping STAs fetch system and operational information about the STA. The beacon may advertise specific wireless network information such as supported PHY rates, security protocols, supported QoS/WMM, vendor specific information, etc. A TIM information element may be included in the beacon. The TIM information element may advertise if any associated STAs have buffered unicast frames. Each STA may have an association ID (AID) and STAs may process the beacon and check a bitmap for their AID. A station may be given a unique AID during the association process with the AP.

The bitmap referred to above may be called a partial virtual bitmap and may be signaled under the TIM IE. The partial virtual bitmap may comprise AIDs for which traffic is buffered at the AP. A STA that has buffered frames may proceed with a process called PS-POLL.

DTIM may have the same role to play for broadcast and multicast traffic as TIM plays a role for unicast traffic delivery. Under the TIM, a DTIM count and DTIM period are noted as below.

The DTIM count field may indicate how many beacon frames till the next DTIM. A DTIM count field of 0 may indicate that TIM is a DTIM whereas a DTIM count field of 1 may indicate the next beacon is a DTIM.

The DTIM period field may indicate the beacon intervals until a DTIM. A DTIM period field of 1 may indicate that every beacon is a DTIM. A DTIM period field of 3 may indicate that every third beacon is a DTIM. A DTIM period field of 5 may indicate that every fifth beacon is a DTIM. When the first bit of the bitmap control field is set to 1, there may be either broadcast or multicast traffic buffered at the AP.

As mentioned earlier, STAs that have buffered data can be woken up at pre-determined intervals and a traffic map can indicate bit fields that can reference one or more STAs on pending data.

It should be noted here that: (1) STAs may wake-up only at pre-arranged schedules; (2) STAs may decode and consume the MAC PDU (e.g., a management PDU); and (3) AP may buffer data up until the time STA's scheduled time for wake-up is encountered, before any communication can resume.

A STA may incorporate a wake-up receiver (WuR) which looks for a specifically encoded waveform (e.g., On-Off Keying (OOK)) to determine the presence of a wake-up packet (WuP). The WuR may be a dedicated, low-power receiver or may be an incorporated component with the primary component radio (PCR). The WuR may listen to one or more WuPs and expend significantly lower energy than the PCR in receive mode. When a WuP is received and when WuR successfully detects the WuP, the WuR may wake-up the PCR.

Figure 5:
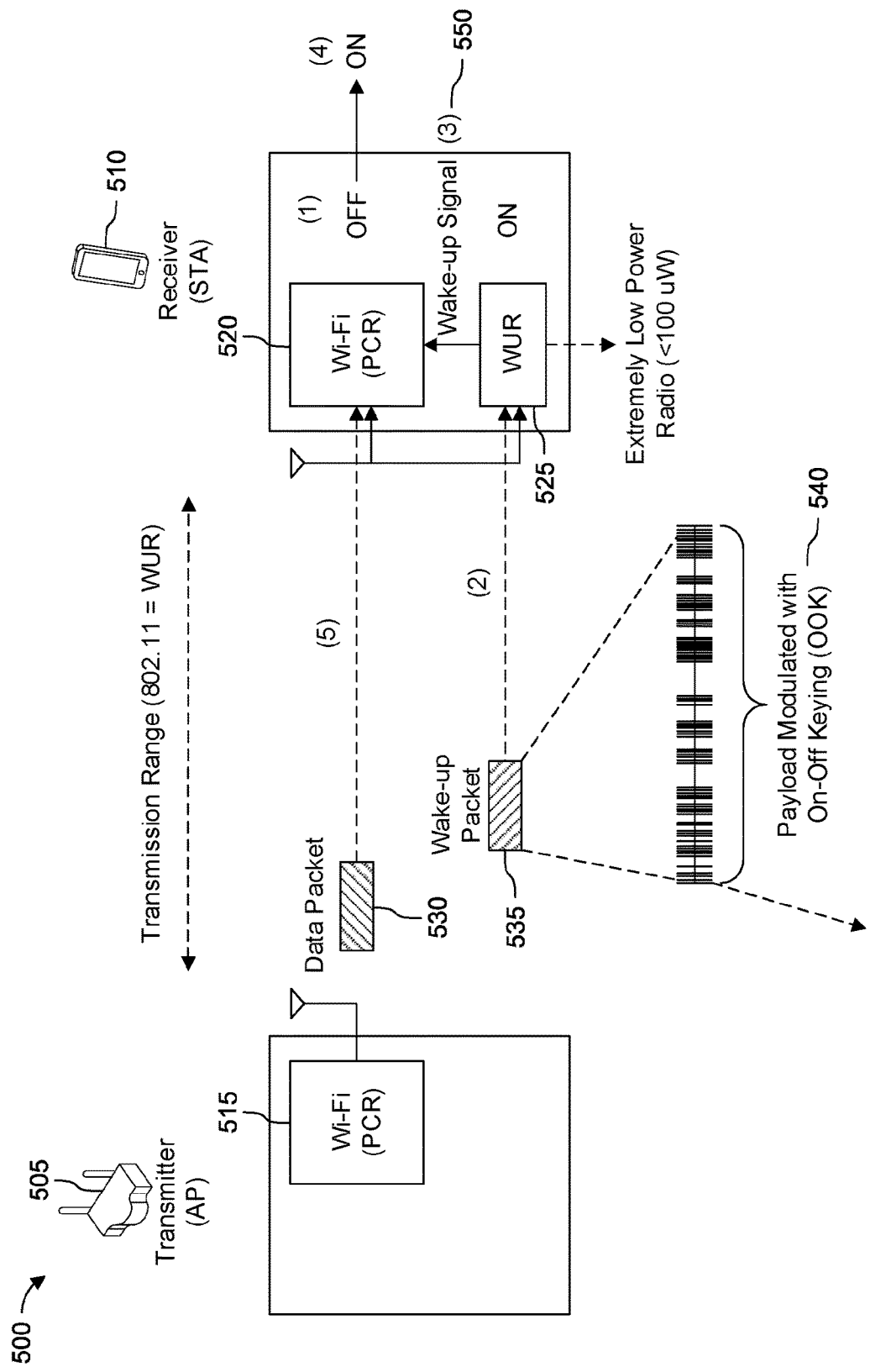
FIG. 5 is a diagram illustrating an example wake-up procedure with a wake-up receiver (WuR)

FIG. 5 is a diagram illustrating an example wake-up procedure 500 with a wake-up receiver (WuR) 525 in an 802.11 network, which may be used in combination with any of other embodiments described herein. As illustrated in FIG. 5, a transmitter (e.g., AP) 505 may be equipped with a transceiver (e.g., PCR) 515 and a receiver (e.g., STA or WTRU) may be equipped with a transceiver (e.g., PCR) 520 and a WuR 525. When the receiver 510 is in power save mode, the transceiver 520 may be turned off and the WuR 525 may be turned on to monitor a wake-up packet (WuP) 535. The WuP 525 may include a payload 540 modulated with on-off keying (OOK). The WuP 535 may also include an 802.11 preamble 545 for coexistence. Upon receiving the WuR 535 that is intended to the receiver 510, the WuR 525 may wake up the transceiver 520, for example, by sending a wake-up signal 550 or indication. This wake-up signal 550 may also be initiated by a processor of the receiver 510. Upon receiving the wake-up signal 550, the transceiver 510 may turn on and monitor data packet 530 from the transmitter 505 using the transceiver 520.

In another aspect, at step (1) in FIG. 5, PCR (i.e., receiver) 520 may negotiate with the AP (i.e., transmitter) 505 and enters PSM. At step (2), the AP requires transmission of a data packet 535 on the downlink towards the PCR 520. The AP may transmit a WuP 535 encoding the identity of the WuR 525 associated with the PCR 520. This identity may be indicated by the AP 505 to the PCR 520 during wake-up mode negotiations, for example, during the step (1) before entering PSM. At step (3), the WuR 525 may decode the WuP 535 (potentially one or more WuP are necessary for a wake-up) and if the identity is correlated, may send a wake-up signal 550 to the PCR 520. At step (4), the PCR 520 may transition from off to on state, transmit a PS-Poll PDU to the AP 505 enquiring pending data. At step (5), the AP 505 may transmit, via the PCR 515, the buffered data to the PCR 520 using one or more exchanges. At the completion of the procedure, the PCR 520 may re-enter off state and the WuR 525 may enter on state.

It is noted that the AP that supports this WuP transmission may be called a WuR AP per IEEE 802.11ba specifications. The WuR may not know that a WuP is addressed to itself until it decodes the MAC portion of the WuP. The expended power by the WuR to decode the PHY PDU as well as the MAC PDU is assumed to be a lot lesser than the power that would be expended if the PCR were to be used. As the number of STAs associated with the WuR APs increases, the WuR-SYNC portion of the PHY PDU may be used for synchronization purposes and as a trigger for all the STAs equipped with WuR to become aware of the WuP. However, the identity of the WuR may be encoded within the MAC PDU and this forces all the WuRs to decode the MAC PDU before deciding to discard. As the number of WuRs increases, the number of unnecessary WuPs required to be decoded may increase. This increase in the WuP decoding may decrease the battery standby time especially when the primary reason for WuR is to prolong battery life. In summary, one or more WuRs may be wake up when there is a need to wake-up only one or a subset of WuRs and the WuRs may decode the MAC PDU to verify the addressing.

As used herein, the term primary connectivity radio (PCR) or primary communication radio may refer to a main radio with capability to transmit and receive one or more physical layer protocol data units (PPDU) via various channels. The term wake-up radio (WuR) may refer to a companion radio to a PCR with the capability to transmit, backscatter, or receive one or more WuR PPDUs. As used herein, the terms wake-up radio, wake-up radio receiver, wake-up radio transceiver, wake-up radio device, companion transceiver, companion receiver, companion radio, passive receiver, passive transceiver, zero-energy (ZE) receiver, ZE transceiver, ZE device, ZE-WuR, secondary transceiver or any combination thereof may be used interchangeably throughout this disclosure. The terms primary component radio, primary connectivity radio, primary communication radio, primary component transceiver, primary connectivity transceiver, main receiver, main transceiver, main modem, primary transceiver, WiFi transceiver, or any combination thereof may be used interchangeably throughout this disclosure. As used herein, the terms wake-up radio (WuR) packet, WuR signal, WuR frame, or any combination thereof may be used interchangeably throughout this disclosure. A WuR STA may refer to a STA that is able to transmit, backscatter, or receive one or more WuR PPDUs. A WuR AP may refer to an AP that is able to transmit, backscatter, or receive one or more WuR PPDUs. The terms WuR STA, WuR WTRU, ZE-WuR STA, ZE-WuR WTRU, ZE STA and ZE WTRU may be interchangeably used throughout this disclosure. The terms WuR AP, WuR BS, ZE-WuR AP, ZE-WuR BS, ZE AP and ZE BS may be interchangeably used throughout this disclosure.

Embodiments for tunneled wake-up radio are described herein.

Wake-up services may be enabled to a group of STAs within a geography that are otherwise not capable of being woken-up by the AP. In use cases where a STA is composed of a primary component receiver (PCR) and a WuR, there are use cases where the STA is able to close the link with the AP using its PCR (i.e., can receive a transmission from the AP) but not able to do so with its WuR. This is possible if the link sensitivities are different between the PCR and WuR. In such scenarios, there are a few STAs within the group that can provide tunneled wake-up services to those WuR STAs that are otherwise not directly serviceable by the AP. In this disclosure, the STAs that can provide such wake-up tunneling or forwarding function may be called head nodes. Once woken up by a head node in the local group, the PCR of the STA may poll the AP and engage in communication. To enable power save mode for all, the STAs may discover each other via direct communications amongst each other. In a different use case, some WuR STAs cannot be directly serviced by WuR APs for wake-up functions. For example, the WuR STAs are outside of the service range provided by a WuR AP. The WuR STAs in such cases may aim to establish ad-hoc or proxied connections with gateway or surrogate STAs within the group.

Examples and figures described in this disclosure may be applied to the IEEE 802.11 framework as well as the cellular networks supported under the 3GPP framework. Procedures over the direct-link referred to throughout this document can refer to local communication link between two 802.11 framework devices and can equally refer to D2D/SideLink/

V2X communication link between two 3GPP devices (e.g., UE, WTRU, or IoT devices). Similarly, procedures over the link between the AP and the STA are equally applicable to the Uu interface in 3GPP.

In one embodiment, certain STAs cannot be directly serviced by WuR APs or ZE-WuR APs. These STAs may be referred to as ad-hoc STAs (a-STAs) throughout this disclosure. The a-STAs may request proxied connectivity through other STAs that have connectivity with WuR APs or ZE-WuR APs. The a-STAs can enable their ZE device or ZE-WuR when proxied wake-up is provided by neighboring STAs. Note that the proxied connection may result in a multi-hop connection towards a ZE-WuR AP. In other words, a-STA #1 may be connected to a ZE-WuR AP via other a-STAs until a final gateway STA directly connects with the ZE-WuR AP. A STA that has gateway functionality may be referred to as a gateway STA (g-STA). A STA that can support an a-STA may be referred to as a surrogate STA (s-STA).

The s-STA that provides proxy functionality to an a-STA may itself be an a-STA in that, it requires proxy function in order to obtain service with a ZE-WuR AP. The s-STA that provides proxy functionality to an a-STA may have gateway capability. In such cases, a s-STA can also be a g-STA. In one embodiment, the ZE-WuR AP may enable ZE-WuR functionality at a STA at the time of association or at the time of exchanging wake-up mode parameters as part of wake-up mode procedures. In a related embodiment, the ZE-WuR AP may enable ZE-WuR functionality at one or more a-STAs by allocating s-STAs ability to perform WuP forwarding.

During the instance, a STA may associate with a ZE-WuR AP. Alternatively or additionally, during the ZE-WuR mode setup request, the ZE-WuR AP may enable ZE-WuR functionality at the STA. The a-STAs may be able to enable such functionality with proxied decisions made via a s-STA. The a-STA may have several possible paths toward establishing connection with a ZE-WuR AP. In one embodiment, a-STAs may discover the presence of other STAs (e.g., other a-STAs or s-STAs) via solicitations. When an a-STA determines that it cannot obtain service from any ZE-WuR AP directly, it may transmit solicit request messages to potential surrogates in the neighborhood indicating, for example, their power capability, QoS requirement and/or a nominal priority for the transmissions and receptions that it will require.

A g-STA (i.e., direct connectivity with a ZE-WuR AP) may respond to a solicit response that has been received from an a-STA. In the solicit response, the g-STA may indicate the level of QoS that it is willing to provide and the typical latency of a wake-up forward (or) wake-up initiation upon a wake-up indication for an a-STA. The g-STA may also indicate the current relative burden it has accepted from previously soliciting a-STAs.

A g-STA when associating for service for the first time may announce to the ZE-WuR AP its ability to support surrogate functions during association request or during wake-up mode setup procedures. The g-STA may indicate one or more capability information to the ZE-WuR AP. Examples of the capability information may include, but are not limited to: the maximum number of a-STAs it can support, whether it can support unicast and/or multicast wake-up forwarding, the mean and maximum latency in forwarding of wake-up packets, whether it can support only certain types of QoS, its power capabilities.

FIGS. 6A-C are diagrams illustrating example wake-up packet (WuP) types 600, 634, 665, which may be used in combination with any of other embodiments described herein. As illustrated in FIG. 6A, a wake-up packet type 600 may include an N bit WuP signature 601 and a headerless control element 602. The N bit WuP signature 601 may comprise a preamble clip 605 and a WuR ID 610. The headerless control element 602 may comprise a WuP option 615, a delayed wake-up indication 620, a linger 625, and a CRC 630. As illustrated in FIG. 6B, a wake-up packet type 634 may include an N bit WuP signature 631 and a non-wake-up MAC PDU fixed length header 632. The N bit WuP signature 631 may comprise a preamble clip 635 and a WuR ID 640. The non-wake-up MAC PDU fixed length header 632 may comprise a WuP option 645, a MAC header 650, data 655, and a CRC 660. As illustrated in FIG. 6C, a wake-up packet type 665 may include an N bit WuP signature 671 and a non-wake-up MAC PDU variable length header 672. The N bit WuP signature 671 may comprise a preamble clip 670 and a WuR ID 675. The non-wake-up MAC PDU variable length header 672 may comprise a WuP option 680, a length 685, a MAC header 690, data 695, and a CRC 697.

As illustrated in FIGS. 6A-C, in one embodiment, the ZE-WuR AP may transmit N bit M-sequence featuring the Wake-up Signatures (WuSs) 601, 631, 671 that are comprised of two parts: (1) a preamble clip 605, 635, 670 that encodes implicit identity of a ZE-WuR AP or a group of ZE-WuR APs within a BSS/ESS; and (2) the ZE-WuR Identities 610, 640, 675 that a ZE-WuR AP intends to wake-up/page. The WuP signature 601, 631, 670 itself may follow the 802.11 legacy preambles and training fields. The WuP signature 601, 631, 670 may be a physical layer wake-up scheme and the ZE-WuR identity 610, 640, 675 may be encoded in the PHY PDU itself. A STA with ZE-WuR that correlates for the one or more identities that is configured on itself can ignore the remaining information that may follow if the WuP is not meant for itself.

During the association and/or the wake-up mode setup procedures, the g-STA may be assigned one or more WuP signatures.

Figure 7:
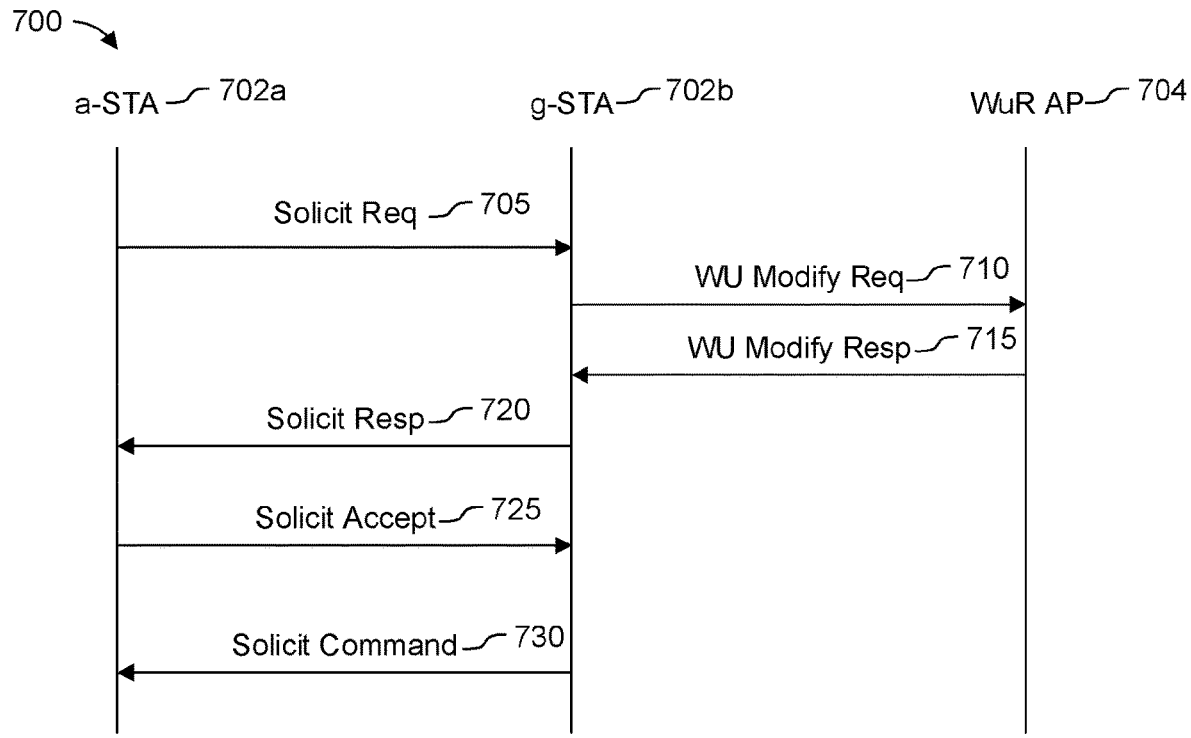
FIG. 7 is a diagram illustrating an example solicitation procedure for proxied services.

FIG. 7 is a diagram illustrating an example solicitation procedure 700 for proxied services, which may be used in combination with any of other embodiments described herein. As illustrated in FIG. 7, an a-STA 702*a* may transmit a solicit request 705 to a g-STA 702*b*. In the solicit request, the a-STA 702*a* may indicate the QoS requirement, services for which it needs to be woken up, the relative priority of each indicated service, whether concurrent (or) overlapping priority can be assigned to one or more of the services. The a-STA 702*a* may also indicate the preferred maximum latency for a wake-up if a page arrives from a data session.

The g-STA 702*b* that has received the solicit request 705 from the a-STA 702*a* and intends to respond to the a-STA 702*a*, may transmit a wake-up modify request 710 to the WuR AP or ZE-WuR AP 704. If the g-STA 702*b* is able to admit the a-STA 702*a* (e.g., capacity permitting), the g-STA 702*b* may assign a nominal identity for the a-STA 702*a* for which it aims to provide surrogate functions and also transmit a modified version of the information obtained from the a-STA 702*a* to the ZE-WuR AP 704. The g-STA 702*b* may decide to admit some or all of the services requested by the a-STA 702*a* and arrange them in its own self-determined priority. The services that cannot be accommodated may be marked as rejected and the services that can be admitted are kept in the priority order. If the QoS requested by the a-STA 702*a* per service is acceptable, the service may be preserved in the admit-list. The g-STA 702*b* may transmit this modified priority list in the wake-up modify request 710 to the ZE-WuR AP 704 requesting unique or group WuP signatures for the a-STA 702*a*.

In the descriptions above, there may be two distinct example variations: (1) the a-STA 702a can only support ZE capability and will need the g-STA 702b to have access to the AP 704. In the first example, the g-STA 702b may aid the a-STA 702a in the authentication/association of the a-STAs with the serving AP 704 first since the g-STA 702b is the gateway for the a-STAs 702a to the AP 704. In the second example, the a-STA 702a may support both PCR and ZE capability and may be already associated with the AP 704 using PCR but may not have access to the AP 704 using the ZE capability and therefore needs the help of a g-STA 702b. The second example is possible since in certain implementations, the ZE and PCR link sensitivities are different.

The ZE-WuR AP 704 may determine the capability of the g-STA 702b, register the g-STA 702b as proxy for the a-STA 702a, assign one or more unique or group WuP signatures to the a-STA 702a in question and transmit a wake-up modify response 715 to the initiating g-STA 702b which provides proxied function to the a-STA 702a.

The g-STA 702b may transmit a solicit response 720 to the a-STA 702a and indicate the subset or full set of services it accepts by transmitting a solicit accept 725. If the requested QoS cannot be met, the g-STA 702b may indicate the QoS that it can provide which may be lower than the QoS requested by the solicit command 730. If only a subset of services is accepted and/or if the requested QoS cannot be met, at this state, the WuP signatures may not be indicated to the a-STA 702a. The g-STA 702b may also indicate the typical wake-up latency that the a-STA 702a may expect, for example, as part of an assigned access category, by sending the solicit command 730.

Figure 8:
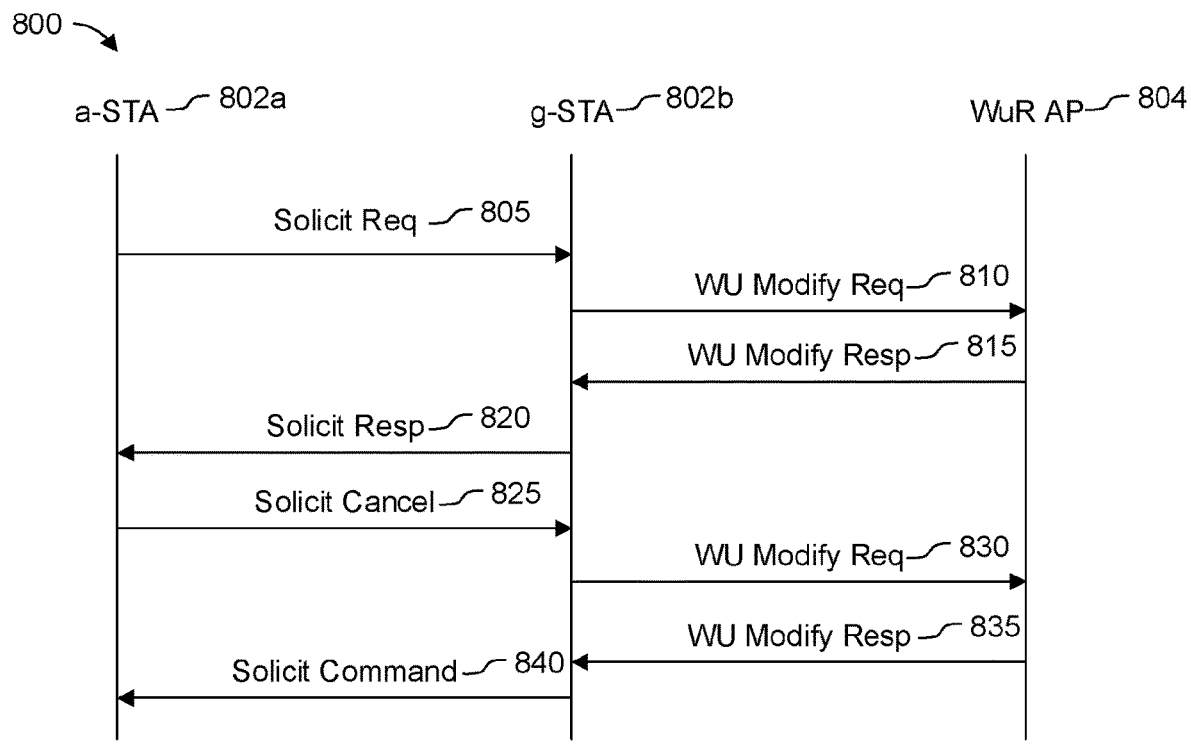
FIG. 8 is a diagram illustrating an example cancelation procedure for cancelling a solicitation.

FIG. 8 is a diagram illustrating an example cancelation procedure 800 for cancelling a solicitation, which may be used in combination with any of other embodiments described herein. The steps 805-820 are the same as or substantially similar to the steps 705-720 described in FIG. 7, and are not described herein for brevity. As illustrated in FIG. 8, when the a-STA 802a receives the solicit response 820, it may determine whether it can operate with a reduced QoS and whether it can operate only the subset of services accepted. If the a-STA 802a agrees with the solicit response 820, it may send a solicit accept to the g-STA 802b (not described in FIG. 8). The g-STA 802b may transmit a solicit command 840 to the a-STA 802a indicating the WuP signatures that it will use for each service that has been requested.

If the a-STA 802a decides not to agree with the solicit response 820, it may send a solicit cancel 825 to the g-STA 802b. The g-STA 802b may transmit a wake-up modify request 830 (or ZE-WuR modify request) to the WuR AP or ZE-WuR AP 804 to cancel the proxied functions previously arranged for the a-STA 802a. The g-STA 802b may receive a wake-up modify response 835 from the WuR AP 804 in response to the wake-up modify request 830.

If the a-STA 802a decides not to agree with the solicit response 820, it may solicit for services via other g-STAs that may be able to support such services. The a-STA 802a may perform the steps indicated above to gain proxied services from other g-STAs.

In some embodiments, if the g-STA responded to an a-STA with an indication that only partial services and/or reduced QoS is possible, the a-STA may accept the response and may also choose an additional g-STA for the remaining services. Thus, in this embodiment, an a-STA may be serviced by two or more g-STAs providing complementing set of proxied services. An indication of partial acceptance of services can signify that either the g-STA or the AP has rejected or restricted the services. In the case the rejection/restriction is from the AP, the a-STA is unlikely to be serviced by more than one g-STA since the AP itself forms the bottleneck. In the case the rejection/restriction is the g-STA, the a-STA has a choice of more than one g-STA.

Figure 9:
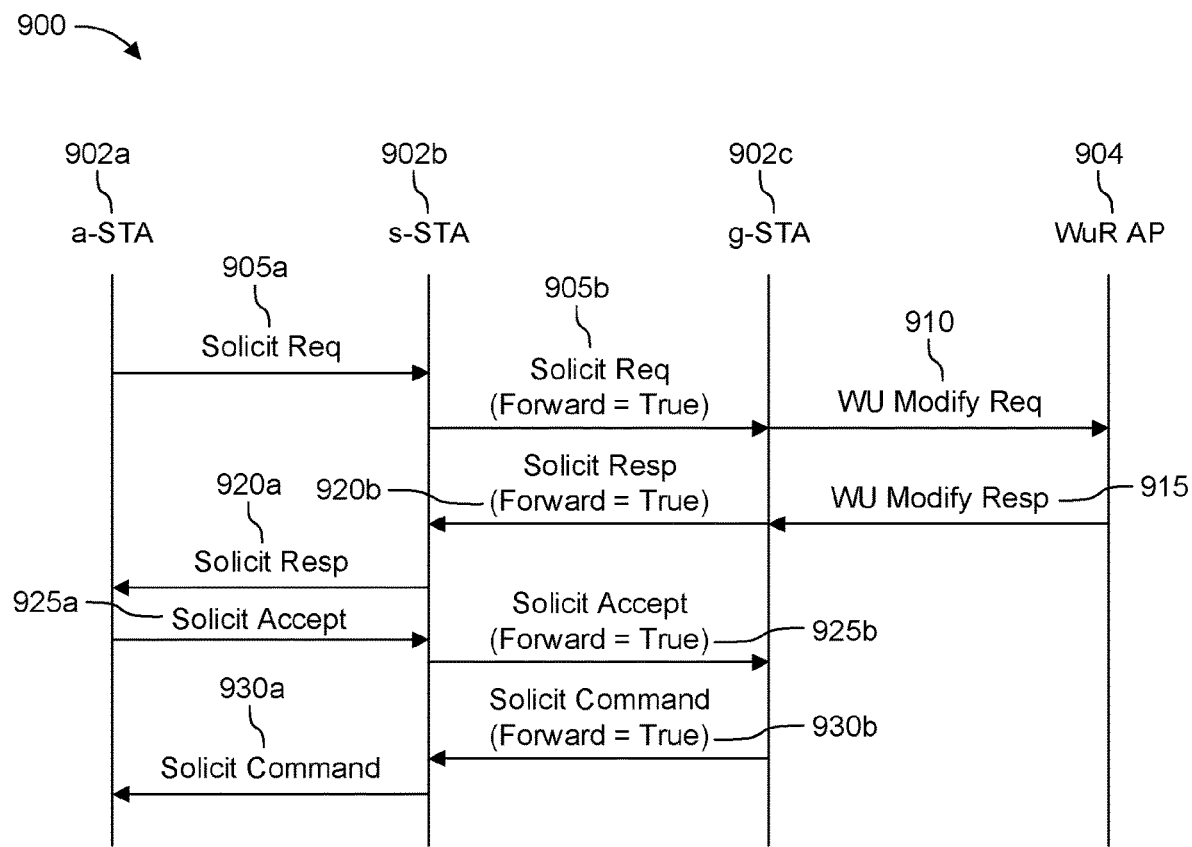
FIG. 9 is a diagram illustrating an example subrogation procedure for surrogating solicitations.

FIG. 9 is a diagram illustrating an example subrogation procedure 900 for surrogating solicitations, which may be used in combination with any of other embodiments described herein. If the a-STA 902a is not directly connected to a g-STA 902c but an intermediate s-STA 902b is connected to a g-STA 902c, the s-STA 902a may provide surrogate services to the a-STA 902a. Upon receiving a solicit request 905a from an a-STA 902a, the s-STA 902b that intends to respond to the a-STA 902a, may re-transmit a modified version of the solicit request 905b to potential g-STAs including the g-STA 902c in the neighborhood. In the solicit request 905b, it may include an indicator or a forward flag set to true indicating that it is not the originator of the original message. Each time a message is forwarded, a forwarding count may be incremented. The forwarding count can be used to determine the number of hops in between to the a-STA 902a. If the s-STA 902b can accept the a-STA 902a (e.g., capacity permitting), the s-STA 902b may assign a nominal identity for the a-STA 902a for which it aims to provide surrogate functions and also transmit a modified version of the information obtained from the a-STA 902a to the ZE-WuR AP 904. If the s-STA 902b decides to admit some of or all the services requested by the a-STA 902a, it may arrange them in its own self-determined priority. The services that cannot be accommodated may be marked as rejected and the services that can be admitted are kept in the priority order. If the QoS requested by the a-STA 902a per service is acceptable, the service may be preserved in the admit-list. The s-STA 902b may then retransmit the solicit request 905b with forward flag set to true to the g-STA 902c that can provide gateway services.

Upon receiving a solicit request 905b with forward flag set to true, the receiving g-STA 902c may perform similar functions as described above in FIGS. 7 and 8 when receiving a solicit request just as it would when receiving from an a-STA that is directly communicable. The g-STA 902c may negotiate with the ZE-WuR AP 904 on behalf of the s-STA 902b by exchanging the wake-up modify request 910 and wake-up modify response 915, and transmit the solicit response 920b back to the s-STA 902b. Upon receiving the solicit response 920b with forward flag set to true, the s-STA 902b may transmit the solicit response 920a to the a-STA 902a. The steps of 925a 925b, 930a, 930b are same or substantially similar to the steps described in FIG. 7 and are not described herein for brevity. In one example, if the g-STA 902c decides to admit some of or all the services requested by the a-STA 902a, the g-STA 902c may arrange them in its own self-determined priority. The services that cannot be accommodated may be marked as rejected and the services that can be admitted may be kept in the priority order. If the QoS requested by the a-STA 902a per service is acceptable, the service may be preserved in the admit-list. The g-STA 902c may transmit this modified priority list in wake-up modify request 910 to the ZE-WuR AP 904 requesting unique or group WuP signatures for the a-STA 902a.

Figure 10:
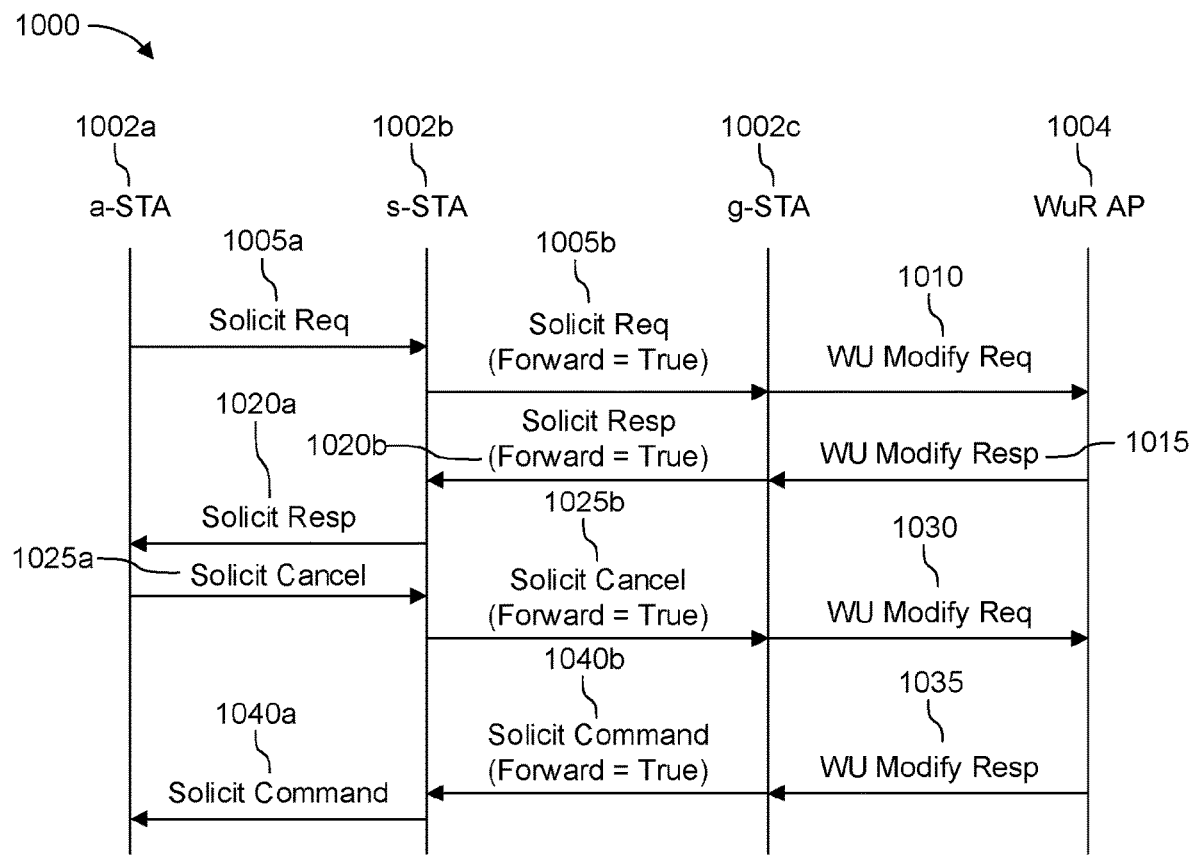
FIG. 10 is a diagram illustrating an example cancelation procedure for cancelling surrogate functions.

FIG. 10 is a diagram illustrating an example cancelation procedure for cancelling surrogate functions, which may be used in combination with any of other embodiments described herein. The steps 1005a, 1005b, 1010, 1015, 1020a, 1020b are the same as or substantially similar to the steps 905a, 905b, 910, 915, 920a, 920b described in FIG. 9, and are not described herein for brevity. If the a-STA 1002*a* decides not to agree with the solicit response 1020*a* received from the s-STA 1002*b*, it may send a solicit cancel 1025*a* to the s-STA 1002*b*. The s-STA 1002*b* may transmit a solicit cancel 1025*b* with an indicator or a forward flag set to true indicating the identity of the g-STA 1002*c* that responded to the solicitation. The g-STA 1002*c* may transmit a wake-up modify request or ZE wake-up modify request 1030 to the WuR AP or ZE-WuR AP 1004 to cancel the proxied functions previously arranged for the a-STA 1002*a*. The WuR AP or ZE-WuR AP 1004 may send the wake-up modify response or ZE wake-up modify response 1035 indicating the cancelation of the proxied functions. The g-STA 1002*c* may send the solicit command 1040*b* back to the s-STA 1002*b* with an indicator or a forward flag set to true. The s-STA 1002*b* may forward the solicit command 1040*a* to the a-STA 1002*a*.

In one embodiment, if an a-STA decides not to agree with the solicit response, it may solicit for services via other s-STAs that may be able to support such services. The a-STAs may bear the responsibility of finding s-STAs that are able to provide the services. In some embodiments, the s-STAs that is unable to support requested services may forward the a-STA's request to a neighboring s-STA. The a-STA may perform the steps indicated above to gain surrogate services from other s-STAs. In some embodiments, if the s-STA responded to an a-STA with an indication that only partial services and/or reduced QoS is possible, the a-STA may accept the response and may also choose an additional s-STA and/or g-STA for the remaining services. Thus, in this embodiment, an a-STA may be serviced by two or more s-STAs/g-STAs providing complementing set of surrogate services. In some embodiments, the a-STA may be serviced by complementing set of one or more s-STAs and one or more g-STAs. If an a-STA receives solicit responses from many s-STAs or g-STAs and it does not require services from all certain s-STAs or g-STAs may transmit a solicit cancel to the peer entity. This ensures unnecessary transmissions or wake-up procedures are initiated by the s-STA/g-STA.

In one embodiment, the s-STA(s) may act just as tunnels and the a-STA then just select a g-STA. In this scenario, the s-STA may be transparent to the a-STA even though the s-STA node is present. In an alternative or additional embodiment, the a-STA may be only responsible of selecting s-STA(s) and s-STA(s) are responsible of selecting the g-STA(s). This is possible since the nodes in the network listen to solicitations and are aware of the capabilities of some of or all the nodes that make up the network.

An a-STA may discover presence of other STAs via solicitation messages over a local link. The a-STA may determine one or more surrogate s-STAs that can provide wake-up functionality. The a-STA may indicate the minimum QoS required to s-STA. An s-STA may indicate acceptance to provide proxy wake-up functions. The s-STA may confirm level of QoS that it can provide as either full or partial. The s-STA may provide proxied ZE WuR functionality for a-STAs. The a-STA may select the s-STA based on loading and capability indication. The a-STA may reject the s-STA if QoS level is unacceptable by sending a solicitation cancel message to the s-STA. The a-STA may select alternative s-STAs. A ZE WuR AP may enable ZE WuR functionality on a-STAs by allocating s-STAs WuP signatures for WuP forwarding. The a-STA may determine if neighboring STA is an s-STA or a g-STA. The a-STA may select proxy services from either an s-STA or a g-STA or both. The a-STA may select proxy based on indicated QoS level by a neighboring s-STA and/or g-STA. The g-STA may indicate whether it can provide unicast or group ZE WuR wake-up forwarding functionality to a-STAs. The g-STA may indicate the maximum number of function-specific wake-up signatures it can support to an a-STA or group of a-STAs. The g-STA may request forwarding of WuP for a-STAs with a serving ZE WuR AP. The g-STAs may indicate identity of each a-STA and QoS requirement to the ZE WuR AP. The g-STAs may indicate capability to support unicast, group or unicast+group WuP forwarding. The g-STA may indicate maximum latency in WuP forwarding. The g-STA may indicate if connection to an a-STA is direct or multi-hop. The a-STA may indicate to an s-STA that it has selected more than one s-STA. The a-STA may indicate to a g-STA that it has selected more than one g-STA.

Embodiments for chained and opportunistically delayed wake-up are described herein. In some embodiments, a set of WuR STAs may have a common requirement to do the same or similar tasks such as IoT sensors. In such embodiments, the WuR STAs may satisfy a common set of requirements and only a subset of those WuR STAs may require unique or explicitly different information for normal operations. Also, in such a group, assisted wake-up can be provided to the STAs. Since these are ultra-low powered STAs, all the devices need not be awake at the same time for receiving commands via the AP. For example, in a system with N nodes, up to (N−1) nodes can sleep for an extended duration of time. This can be done with the set of WuR STAs having a common wake-up duty cycle within a service period. The service period may be determined between the AP and the WuR STAs during association or any head node in the group of STAs based on energy harvesting information such as energy harvesting state, energy harvesting capability, and energy drain rate. When they exchange WuR mode parameters with the WuR AP, they may exchange the common denominator of WuR operational IEs. A rotational-system may be applied to determine the non-overlapping order in which WuR-STAs can choose to wake up within the Wu Duty cycle. In a group of N WuR-STAs, up to (N−1) can sleep for (N−1) additional cycles than otherwise.

Even though up to (N−1) devices out of N may sleep, there may be some overlap in order for one WuR STA to pass on pending commands to the next WuR-STA that would wake up. Each WuR[i] may stay awake for a duration of time in its service period during which all the other WuRs sleep. Therefore, while the AP can exchange information with the group every cycle, each WuR-STA within the group can receive its respective information only every 3 cycles either directly from the AP or through a forwarded message from another WuR-STA in the group.

Figure 11:
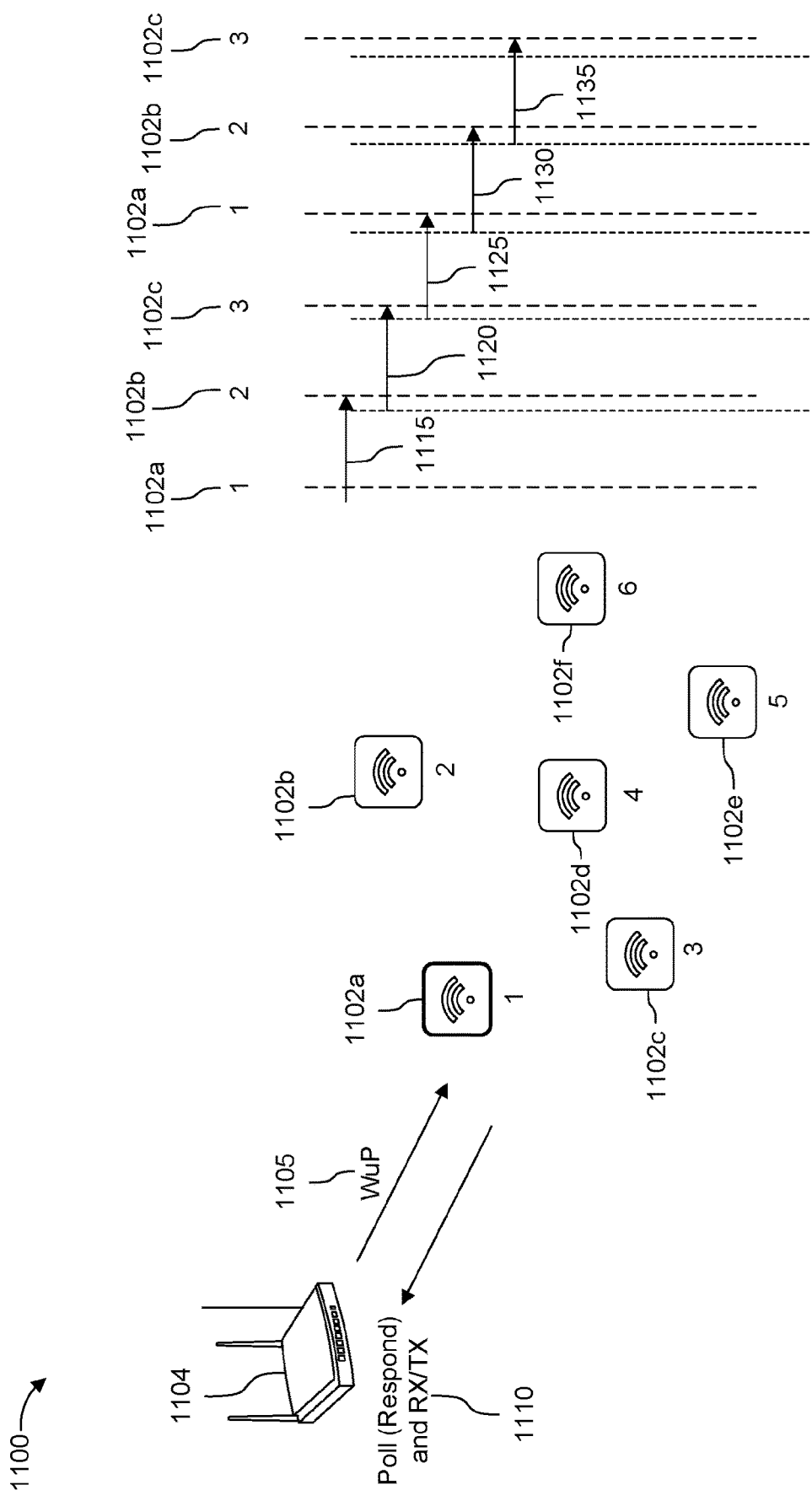
FIG. 11 is a diagram illustrating an example chained wake-up and localizing traffic.

FIG. 11 is a diagram illustrating an example chained wake-up and localizing traffic 1100, which may be used in combination with any of other embodiments described herein. Assuming that the head nodes are STA 1 1102*a*, STA 2 1102*b*, and STA 3 1102*c* and a group of STAs comprises STA 1 1102*a*, STA 2 1102*b*, STA 3 1102*c*, STA 4 1102*d*, STA 5 1102*e* and STA 6 1102*f*, service periods 1115, 1120, 1125, 1130, 1135 of the head nodes (i.e., STA 1 1102*a*, STA 2 1102*b*, STA 3 1102*c*) may overlap each other as illustrated in FIG. 11. For example, the WuR or ZE device of STA 1 1102*a* wakes up during the STA 1's service period 1115 and may receive, from an AP 1104, a wake-up packet 1105 addressed to the STA 1 1102*a* or any other STAs 1102*b*-1102*e* in the group. If the wake-up packet 1105 received at the STA 1 1102*a* is addressed to the STA 1 1102*a*, the STA 1 1102*a* may consume the wake-up packet 1105. Otherwise, the STA 1 1102*a* may send (e.g., backscatter) the wake-up packet 1105 (or a command or an indication that the wake-up packet 1105 is received for the STA to which the wake-up packet 1105 is addressed) to the STA 2110*2b* (i.e., next head node in the service period schedule for the group) while the STA 1's service period 1115 overlaps the STA 2's service period 1120 as illustrated in FIG. 11. After the STA 1's service period 1115 ends, the STA 1 1102*a* may go to a sleep state or power save mode. When a STA (e.g., STA 1 1102*a*) wakes up during its service period (e.g., service period 1115), the STA may send a poll response frame 1110 to the AP 1104 for further communication (e.g., transmission/reception) with the AP 1104.

The traffic within the network can hence be categorized into two: non-local and local traffics. First, the traffic is non-local if the traffic is between the serving AP and any of the STAs in the network. Second, the traffic is local if the traffic is confined between the STAs in the network. Local traffic is expected to consume much lower power, for example, utilizing backscattering techniques, than non-local traffic, for example, utilizing semi-passive or active transmission techniques.

In this example, the WuRs that intend to form a group may exchange their respective capabilities (e.g., energy harvesting) to each other during the group formation stage. The WuR STA with a MAC address that has the smallest value in most-significant byte number may be self-elected as the arbitrator at group formation stage. Each WuR that intends to become part of the group may exchange their capabilities using solicit messages. The WuRs may exchange several capability information set amongst each other inclusive of their current energy harvesting state, energy harvesting capacity and energy drain rate, link budget limitations such as maximum coupling loss supportable, frequency of wake-up acceptable, subscription information relating to one or more message types, duration of wake-up acceptable, capability to act as a head node for arbitration purposes, compute capabilities such as presence of Network Processing Units (NPU)/General Purpose Processing Units (GPU) and clock frequencies, capability to act as a dedicated RX and TX node for communication with WuR-AP for indicated wake-up duration among many other. At the time of group formation, the node with the smallest value in MSB of the MAC address sends a group management indication message to all candidate WuRs in the group indicating its own MAC address as a head node and sets the state-flag to group formation. In another embodiment, the default head-node at group formation may select another higher capable device. The task of identifying the node with the smallest value of MSB in a MAC address may be self-enforced. Also, in another embodiment, only a subset of the WuR STAs may have the capability to be head nodes (e.g., based on their capabilities) and this capability can be included as an indication in a capability exchange message.

New WuRs that power up or are discovered after this state may still send the solicit request message to the group, but the head node may not change during the group formation once the indication message is sent out. The head node may set the head-of-line signal to none indicating that there are no previous messages in existence for forwarding or to be acted upon. The head node may add the newly discovered WuR into the group-list at any time. If the group-list has not been updated to reflect the newly entering WuR, the WuR may start the joining process by transmitting solicit request message again. The WuR that is acting as the head node at that specific time may include the newly discovered WuR and update the wake-up schedule. The head-of-line signal may indicate a specific STA in the group that acts as a head node. For example, during the service period of STA 1, STA 1 is the head of line and during the service period of STA 2, STA 2 is the head of line.

The head node may decide on the common-denominator capabilities of all WuRs. The common-denominator may determine a service cycle or common service period. The service cycle or common service period may be broken into integer multiple of wake-up cycles W of equal length where W is greater than or equal to N, the number of WuR nodes in the group. In one service cycle or common service period, each WuR may wake up at least once. More capable WuRs may be determined by the head node to wake-up more than once within the service cycle or common service period. The WuRs that are determined to be awake for more than one wake-up cycle within the service cycle may be awake for consecutive or non-consecutive wake-up cycles as determined by the head node. The head node may make these determinations based on the capabilities of each of the WuR indicated during the solicit stage. When a group is formed and the schedule is determined by the head node, the group management indication message may be transmitted again with state flag group_formed addressing each WuR admitted to the group and the schedules determined for each of them.

The WuR that is woken-up may be the head node of the entire group when it is awake. The WuR that is awake may make the decisions on behalf of the group unless its capability precludes such possibility. For example, the WuR that is awake may ignore the solicit request it receives from a new WuR wishing to enter the group if its own wake-up cycle is coming to an end and the remaining duration is insufficient to complete the task.

If a new WuR attempts to join at a later stage after group-formation, the prevailing head node may admit the new WuR based on principles indicated above. It may update the wake-up schedule (or common service period) and inform the new WuR of its wake-up roster and the changed roster for the pre-existing WuR members. It is noted that the changed roster may not take effect until the service cycle is complete. Since a change in wake-up scheduling incorporating the new WuR is unknown to the WuRs that are asleep, the new schedule may not take effect until the currently defined service cycle is complete. In other words, the change in schedule may be announced and forwarded to each WuR that subsequently wakes-up during their own wake-up cycle for an entire service-cycle until the group becomes aware of the change in schedule that incorporates the new WuR.

The head WuR STA may be the sole node that listens to wake up attempts from a WuR-AP. The WuR STA (i.e., head node) that is awake may also be the device that responds to the WuR AP with Poll PDU upon a wakeup packet reception. Upon a WuP reception, even if the WuP is not meant for itself, the WuR-STA may engage in TX and RX with the WuR AP on behalf of one or more of the WuR STAs in the group. If the reason for wake-up is itself, the WuR AP may receive the data and consume it. If the payload is meant for other nodes in the group, the head WuR STA, may store and then forward the information to the next WuR STA that would wake up within the service cycle.

When the service period for WuR[i] is about to come to an end and when the next WuR[j] enters its wake-up cycle within a service period, the pending commands and information can be passed on from WuR[i] to WuR[j]. Without a reasonable overlap between service periods of WuR[i] and WuR[j], one may enter sleep when the other is about to wake up. WuR STA[i] may stay awake a delta time unit after WuR STA[M] wakes up. During the service period of WuR[i], it may have captured several wakeup commands addressed only for WuR[i] or other WuRs[#i].

When a WuP is received from the AP, the WuR on watch (e.g., WuR[i]) may consume the WuP and poll the AP for pending data to be delivered. It is noted that the WuP may not have been meant for WuR[i] but since it is the WuR on watch, it may wake up its PCR to poll and fetch the information from the AP. In this cooperative scheme, the WuP can lack specific and address the entire group or the WuP may be addressed to a single WuR.

When a new WuR enters its wake-up cycle, the previous WuR (e.g., head node) may set the head-of-line signal to indicate presence of stored information during the previous wake-up cycle. The WuR head node may transmit the head-of-line signal first just after it is sure the new WuR would have woken up. In the head-of-line signal, the WuR head node may transmit control information pertaining to size of payload to follow, modulation scheme applied and any robustness scheme it may apply (such as repetition etc.). The head-of-line signal may also be updated to indicate the wake-up cycle period (index) within the current service cycle.

When the WuR is about to exit its wake-up cycle (or service period) and enter sleep, it may include any "delta" change in capability if appropriate. The head-of-line signal may indicate a change in capability and a change in wake-up schedule for the next service period. If a WuR wants to detach from a group in the next service cycle, it may wake up asynchronous to the wake-up schedule that exists and transmits a solicit request message to the current head node indicating its request to leave the group on the next service cycle. The head node may mark the WuR wishing to leave and updates the schedule. The updated schedule may be transmitted to each subsequent node that wakes up for one full-service cycle so that all WuR nodes are aware of the change in schedule.

In some embodiments, there may be a WuR STA that is part of the group that wakes up ahead of schedule or outside of its schedule. When it wakes up ahead of schedule or outside of its schedule for specific purposes and intends to stay up for a duration equal to or longer than the wake-up cycle, it may transmit a group management indication with state-flag opportunistic swap. The head node that is currently servicing the group may receive this management message and may decide to swap the head node role with the device that opportunistically woke up. The head node may prepare the head-of-line signal and the chained payloads and transmit it to the opportunistically awake WuR and pass on the head node role. The node that opportunistically woke up may service the group in the role of a head node until the end of the wake-up cycle. The node that opportunistically woke up may regardless have to service its pre-determined wake-up cycle nevertheless.

In either case, the WuR[i] on watch, may poll the AP and fetch data that is addressed to the group or to the specific WuR[#i]. Suppose that WuR[1] is on watch and it receives WuP for a group, it may consume the payload and propagate the same payload just prior to entering sleep. Since WuR[2] wakes up just prior to WuR[1] entering sleep, WuR[2] may receive the payload, consume it and propagate it further. This is also illustrated in FIG. 11. An identity mask of the WuRs that have so far consumed the payload is included as part of the transmission so that the payload is not perennially in circulation. When a WuR[1] receives the propagated message and sees its own identity masked in the payload, it may know that the payload has done a full circle and propagation stops.

Figure 12:
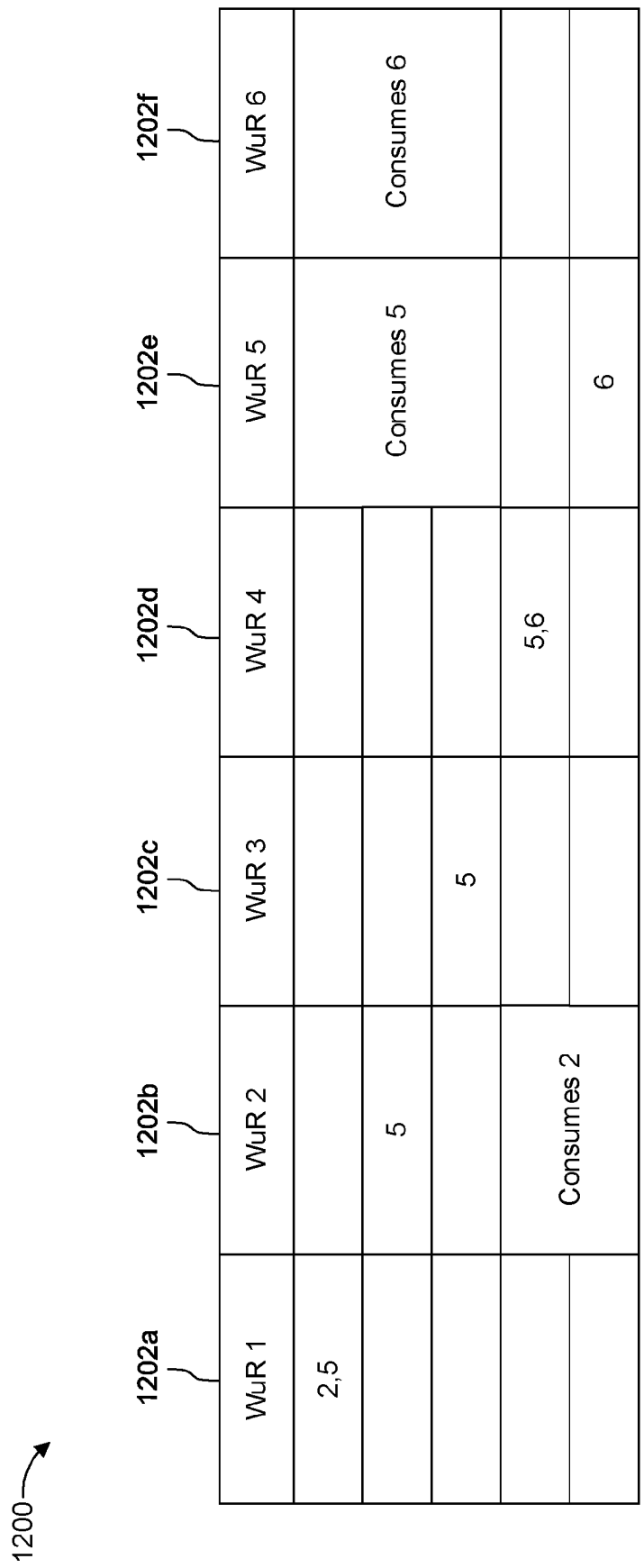
FIG. 12 is a diagram illustrating another example of chained wake-up.

Two aspects may be considered for broadcast traffic. First, the payload may be fragmented into smaller payloads (i.e., it is an augmented payload) as it might be an accumulation of information received by multiple head nodes in a single service period. Second, each fragment can be assigned a WuR STA ID which belongs to the WuR STA that originally received it from the AP. Since the head node transition schedule is known to the WuR STAs within the group a priori, a WuR STA detecting the ID of the WuR STA that is next in line may consume the information fragment and remove it from the augmented payload. This way, the WuR can simultaneously propagate multiple payloads to the group just prior to entering its sleep routine but the identity mask is specific to each payload. Alternatively or additionally, the WuR[1] may have consumed a WuP meant for another WuR. FIG. 12 is a diagram illustrating an example of chained wake-up 1200, which may be used in combination with any of other embodiments described herein. As illustrated in FIG. 12, the WuR[1] 1202*a* has received a WuP for WuR [2,5] 1202*b*, 1202*e*. The WuR[1] 1202*a* may propagate it to the next WuR that wakes up, which coincidentally is WuR [2] 1202*b*. The WuR[2] 1202*b* may consume the WuP and propagate the WuP addressed to WuR[5] to next WuR with the pending payload before it enters sleep. WuR[3] 1202*c* may propagate the WuP to the next WuR that wakes up, which coincidentally is WuR[4] 1202*d*. The WuR[4] 1202*d* receives another WuP for WuR[6] 1202*f*. The WuR[4] 1202*d* may propagate the WuP to the next WuR that wakes up, which coincidentally is WuR[5] 1202*e*. The WuR[5] consumes the WuP and propagate the WuP for WuR[6] 1202*f* to the next WuR that wakes up, which coincidentally is WuR [6] 1202*f*. The WuR[6] may consume the WuP. This may continue along with any other intermediate WuP for other WuRs the intermediate WuP may receive.

In another embodiment, if an intended recipient WuR STA[k] had woken up to consume a WuP intended for itself, that recipient may poll a WuR AP to fetch data. WuR STA[k] may remove its WuP from the list and PCR[k] broadcasts to the internal address prior to its sleep. A notion of cluster or group thus exists. A WuR STA can receive, process a WuP for members within its cluster or group. A WuR may forward its pending list to the next WuR when the next WuR's duty cycle (or service period) is up. In some cases, a WuR STA can respond and act on the WuP that it receives for another STA as described above.

In order for the scheme to work, the WuR-STAs may discover each other via direct communications. The WuR-STAs may discover other WuR-STAs in the neighborhood to determine if they can be part of the same group. In the discover request message, the STAs may identify themselves and indicate a series of tags that may be appropriate for neighboring WuR STAs to participate or join. The discover request message may be periodic as well as aperiodic triggered on events. A discover request may be followed by one or more WuR STAs sending a discover response. The discover response message may indicate the one or more of the requested tags that the responder has decided to subscribe to or join. In addition to those tags, the responder may add additional tags of its own that the initiator may choose to reverse join if applicable. This way, both the initiator and the responder can indicate orthogonal sets of tags that the two WuR-STAs may have a common reason to join.

The messages may be one to many in that, multiple responders can choose to respond to the initiator and the multiple responders may choose to subscribe to one or more of the tags. When a group is formed in this manner, for each tagged-group, the WuR STAs may devise a common timetable (or common service period) with a service period and a sleep period. To ensure that there are no loops and loss of convergence, a WuR-STA can self-elect itself as a leader or head node to remove contention. In one embodiment, the WuRs may incorporate energy aware methods. During the discovery procedure, the WuR STAs may also indicate their energy harvesting capability and whether they can utilize methods such as backscattering. The WuR STAs that have higher capability to build their energy reserves or a better capability to utilize ambient energy are better capable of performing wake-up functions for longer and at increased frequency. The head WuR-STA may rank the discovered devices within the tag in terms of capability (e.g., energy reserves and regeneration capability) and split the service periods among the WuR STAs either equally or split them unequally favoring longer service periods for higher capable WuR STAs. The head WuR-STA may itself not be a higher capable WuR-STA. The election process may involve any method such as the WuR STA with smallest MAC address automatically inherits capability to become head WuR-STA even it is not as capable as other WuR STAs. The head WuR-STA may send a discovery report to each member in the tag and the members of the tag may send a discovery accept message to accept the schedule.

In an embodiment, the discovery may be facilitated by the AP. The WuR STAs may send a list of tags to the AP and request AP to assist with discovery. When the AP encounters another WuR STA with a tag preference, it may inform the initiator that there is a responder if they are in the same geographical area. The AP may determine the two WuR STAs are in the same geographical area based on global navigation satellite system (GNSS) reports, angle of arrival, long term pathloss estimations or a combination of all or parts of these.

If a group of WuR STAs are discovered and responded to in this method, the AP may keep track of all the WuR STAs subscribing to the same tag. The AP may indicate service periods to each WuR STA and may decide to wake up one WuR STA within the tagged-group as opposed to waking up all WuR STAs. When the nominated WuR STA receives a WuP, it may poll the AP and fetch the payload. When it is time for its cycle or service period to end, it may know that another WuR STA would have woken up just ahead and it can propagate the pending payloads to the next WuR on watch.

The text above can be embodied as follows. A head node may create a local group and orthogonal wake-up schedule (or common service period) for each member in the group, transparent to the AP. The head node may arbitrate a sufficient overlap in wake-up between pairs of WuR[i] and WuR[j] at group formation. The head node may receive a WuP from the AP and create a head-of-line packet if the WuP is first packet. The head node may chain a new WuP to head-of-line signal and add identity of receiver. The head node WuR STA may forward a chained wake-up commands to a next head-node WuR or one or more WuRs at the end of service period. A serving head node WuR STA may stay awake a delta time unit after a next head node WuR STA wakes up and inherits the head node position. The head node may transmit information received in epoch [k−1] to an internal (localized) address for the group. The head node may opportunistically hand over schedule to a head node that wakes up out-of-turn and transmit remaining duration in service period and current head-of-line signal. The head node may apply an identity mask of the WuRs that have so far consumed the payload so that the payload is not in circulation outside of a service cycle.

Embodiments for communal signatures are described herein.

In some embodiments, a g-STA may only be able to offer proxied functionalities for group messaging. When providing proxied functionalities, the g-STA may group a-STAs and hierarchically arrange them in ascending order of priority. In this embodiment, the g-STA may not have enough capacity to support unicast services, but may be able to support communal, group services. The a-STAs may be grouped based on certain conditions, for example, service type requested. By grouping the a-STAs into certain categories (e.g., service type requested), the g-STAs can wake-up one or more a-STAs with a group, communal signature.

Figure 13:
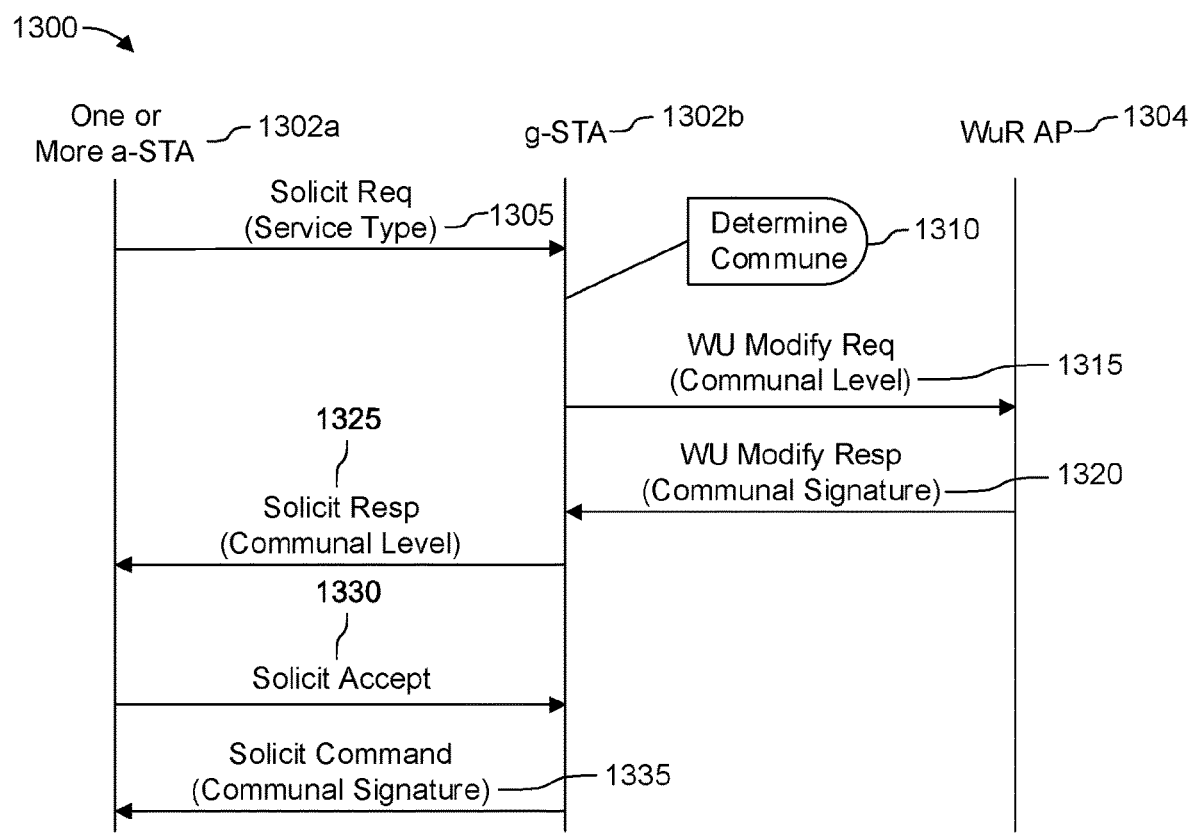
FIG. 13 is a diagram illustrating an example procedure for communal proxy support.

FIG. 13 is a diagram illustrating an example procedure 1300 for communal proxy support, which may be used in combination with any of other embodiments described herein. As illustrated in FIG. 13, upon receiving a solicit request 1305 which includes service type requested from one or more a-STAs, at step 1310, the g-STA 1302b may determine the commune to which this incoming a-STA 1302a may be mapped. The g-STA 1302b may then map the a-STA 1302a into that commune and signal the addition of the a-STA 1302a into a commune with an associated priority for the commune. The g-STA 1302b may indicate the communal level and the group of a-STAs (e.g., existing a-STAs in the commune including the new, incoming a-STA becoming part of the commune) to the WuR AP or ZE-WuR AP 1304 in a wake-up modify request 1315. The ZE-WuR AP 1304 may determine a communal signature and transmit the WuP communal signature to the g-STA 1302b in a wake-up modify response 1320. The g-STA 1302b may transmit, to the a-STA 1302a, a solicit response 1325 with the communal level and the a-STA 1302a may accept it by sending back a solicit accept 1330. A priority level k may be indicated on the communal signature when the ZE-WuR AP 1304 configures the WuP communal signature at the g-STA 1302b. If a commune does not exist already, the g-STAs may start a new commune and add the a-STA into that commune. Subsequently joining a-STAs may be added to this commune. The communal signature may implicitly map a priority. The communal signature may be indicated to the a-STA 1302a in a solicit command 1335.

Figure 14:
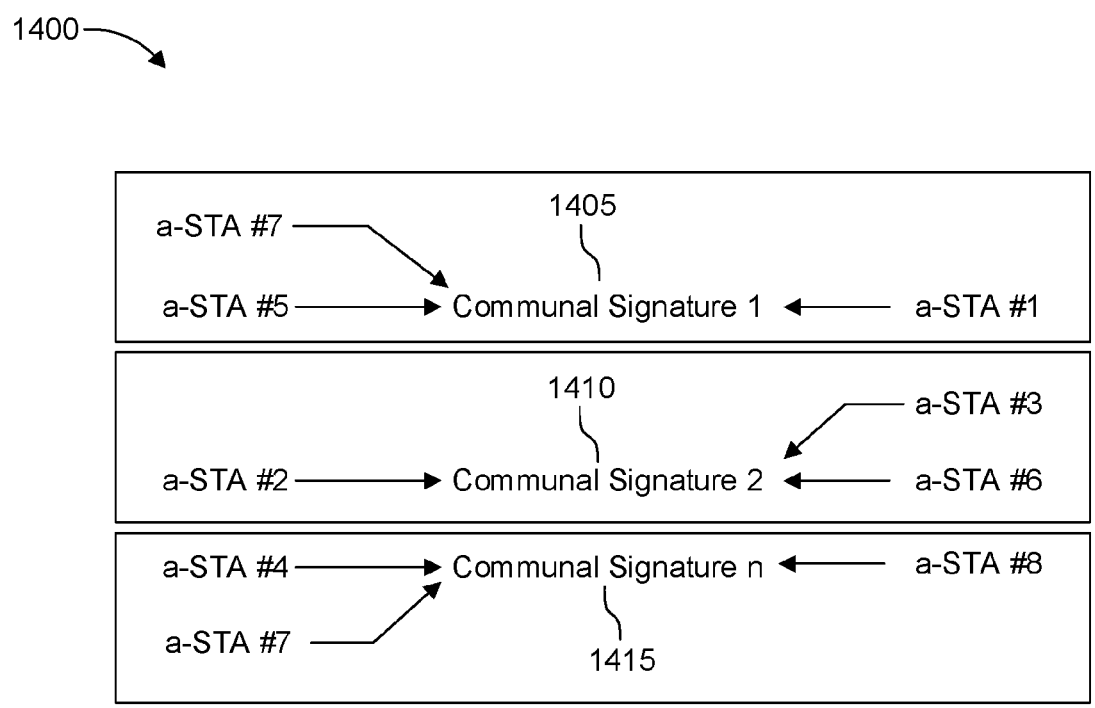
FIG. 14 is a diagram illustrating example communal signatures.

FIG. 14 is a diagram illustrating example communal signatures 1400, which may be used in combination with any of other embodiments described herein. As illustrated in FIG. 14, one of more a-STAs may be mapped to a communal signature. For example, a-STAs #1, 5, 7 may be mapped to communal signature 1 1405. a-STAs #2, 3, 6 may be mapped to communal signature 2 1410. a-STAs #4, 7, 8 may be mapped to communal signature n 1415. In this exemplary illustration, a-STA #7 is mapped to two communal signatures, communal signature 1 1405 and communal signature n 1415. A communal signature may indicate the priority level implicitly and a-STA #7 can be woken up on two differing levels of priority. The g-STA may indicate to the a-STA one or more communal signatures using which it can be woken up.

Figure 15:
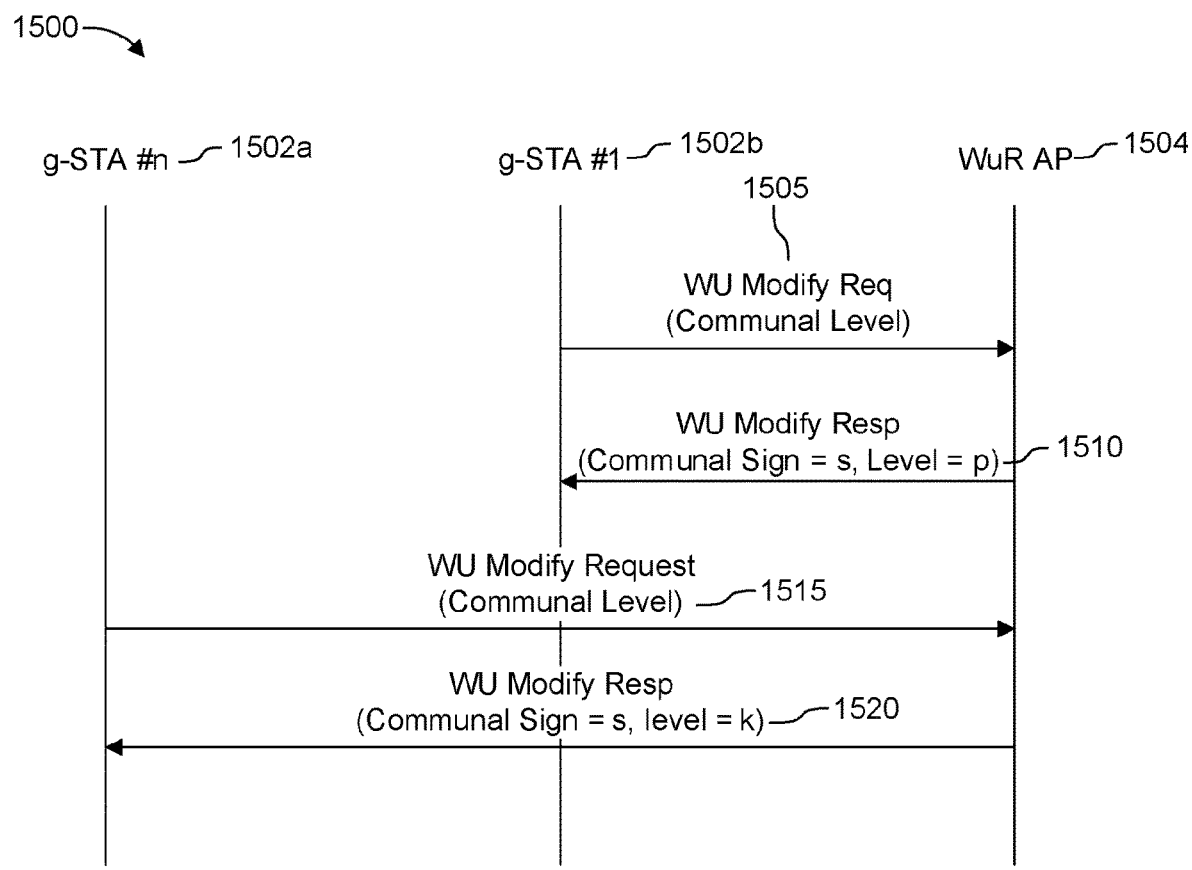
FIG. 15 is a diagram illustrating an example procedure with priority levels assigned to communal signatures at gateway stations (g-STAs)

FIG. 15 is a diagram illustrating an example procedure 1500 with priority levels assigned to communal signatures at gateway stations (g-STAs), which may be used in combination with any of other embodiments described herein. As described above, the a-STA may also be complimentarily connected to and serviced by other g-STAs. The other g-STAs may also be configured with the same communal signatures by the ZE-WuR AP 1504 to increase probability of successful transmission of a WuP signature to a commune. As illustrated in FIG. 15, a ZE-WuR AP 1504 can increase the probability of successful wake-up of an a-STA using communal wake-up procedures incorporating redundancy and priority. When a g-STA (e.g., g-STA #1 1502b and/or g-STA #n 1502a) transmits a wakeup modify request 1505, 1515 indicating communal level, one or more communal signatures and an associated priority level may be indicated by the ZE-WuR AP 1504 to the g-STA (e.g., g-STA #1 1502b and/or g-STA #n 1502a) in a wake-up modify response 1510, 1520. In FIG. 15, it is noted that communal signature s is assigned priority level p at g-STA #1 1502b and the same communal signature s is assigned a different priority level k at g-STA #n 1502a. The lower the priority value, the higher the priority level of the communal signature at a given g-STA. For example, if priority level p<priority level k (i.e., value of p<k), g-STA #1 1502b may be implicitly assigned a higher probability of propagating the WuP signature s to the a-STAs when it successfully correlates WuP signatures from the ZE-WuR AP 1504.

Figure 16:
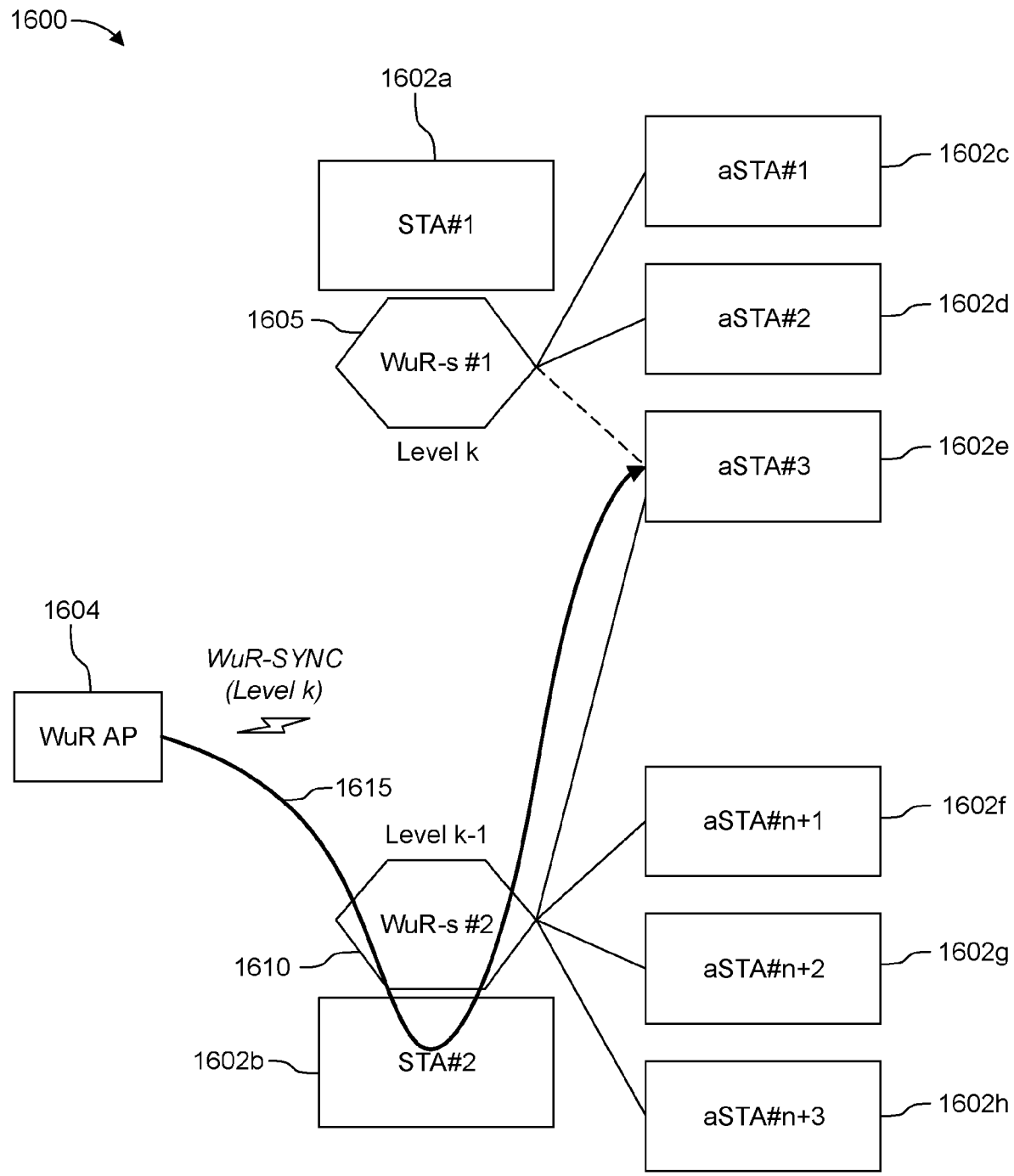
FIG. 16 is a diagram illustrating an example priority aware communal wake-up.

FIG. 16 is a diagram illustrating an example priority aware communal wake up 1600, which may be used in combination with any of other embodiments described herein. As illustrated in FIG. 16, when a ZE WuR AP 1604 transmits a WuP communal signature, an associated priority level may also be derived from that signature since the communal signature encodes a hierarchy as described above. The WuP signature may be received by both ZE-WuR #1 1605 of g-STA #1 1602a and ZE-WuR #2 1610 of g-STA #2 1602b. Since the communal level configured at ZE-WuR #2 1610 is level k−1 and the communal level for the same signature is configured at level k at ZE-WuR #1 1605, ZE-WuR #2 1610 may wake up g-STA #2's 1602b primary communication radio (PCR) to retransmit the WuP communal signature to a-STAs subscribed to receiving it. This is illustrated by the arrow 1615 traversing from the ZE-WuR AP 1604 to the a-STA #3 1602e via g-STA #2 1602b in FIG. 16. It is noted that a dotted line from g-STA #1 1602a to a-STA #3 1602e exists indicating a viable link/signature transmission path. However, since ZE-WuR AP 1604 determines that g-STA #2 1602b is better suited to transmitting the communal signature, it may encode a hierarchical level k−1 into the communal signature enabling only ZE-WuR #2 1610 to wake up its PCR of g-STA #2 1602b whereas ZE-WuR #1 1605 ignores the communal wake-up signatures.

In some embodiments, the ZE-WuR AP may transmit a communal signature s at level k. Since ZE-WuR #1 is configured at level k, it may wake up the PCR of g-STA #1. Since configured level k−1 is higher than received level k, ZE-WuR #2 wakes up the PCR of g-STA #2. In this embodiment, to increase probability of successful transmission and to implement redundancy, the ZE-WuR AP may trigger two or more g-STAs to forward the wake-up communal signature. In one embodiment, where the a-STAs are serviced by s-STAs instead of g-STAs, the s-STAs may perform a second level retransmission of the WuP signature if its configured level is higher than the encoded hierarchy inside of the WuP signature. The ZE-WuR companions of s-STAs, g-STAs and a-STAs that receive WuP signatures not meant for themselves may use the WuP signature for: (1) synchronization procedures; (2) energy harvesting; and (3) neighbor STA determination among other things. In one embodiment, a receiving node may backscatter information on the uplink using transmissions received from other nodes.

The details above can be embodied as below. A g-STA may receive a solicitation request from a-STA. The g-STA may determine if communal wake-up can be enabled for a-STA for requested QoS. The g-STA may determine which commune to attach a-STA into. The g-STA may determine commune based on QoS similarity: if other previously admitted a-STAs have similar QoS and/or priority level as incoming a-STA. The g-STA may determine commune based on location similarity: if other previously admitted a-STAs are in the same geographic location as incoming a-STA. The g-STA may determine commune based on distance similarity: if other previously admitted a-STAs are in the same distance range as incoming a-STA. The g-STA may create a new commune if an appropriate commune does not exist already. The g-STA may attach an a-STA to one or more communes. The g-STA may match a WuP signature to a commune. The g-STA may request ZE WuR AP to be associated to one or more existing WuP signatures. The g-STA may request ZE WuR AP to be associated to a new WuP signature. An a-STA may allocate a communal WuP signature indicating communal identities to a-STA. The g-STA may determine relative priority of a-STA and s-STA within a commune. The g-STA may determine a hierarchical wake-up scheme. The g-STA may attach a communal forwarding level to each s-STA based on s-STA location. The g-STA may attach a communal forwarding level to each s-STA based on s-STA capability. The g-STA may assign communal hierarchy level to each s-STA in the commune. The g-STA may map each communal level to a WuP signature. The g-STA may transmit a communal WuP targeting one or more s-STAs.

Embodiments for group and communal level determination are described herein.

The STAs (in either ZE-WuR mode or PCR mode) can detect and sense the presence of other nodes in the neighborhood via coincidental and purposeful monitoring of transmissions. While a solicit request may be sent by an a-STA with no awareness of neighbors in the area, the a-STA may also determine the presence of neighbors via passive monitoring. The same passive monitoring may also be performed by the s-STAs and g-STAs in order to determine solicitation requests from un-serviced a-STAs. The a-STAs may use the passive measurements to determine the strongest candidate s-STA or g-STA that may be able to provide surrogate or proxy function. The a-STA may do so by measuring carrier energy (e.g., RSSI) or a signal quality (e.g., SNR) when a coincidental or purposeful transmission is made by a neighbor.

Embodiments for deferred tunneling of wakeup packets are described herein.

Figure 17:
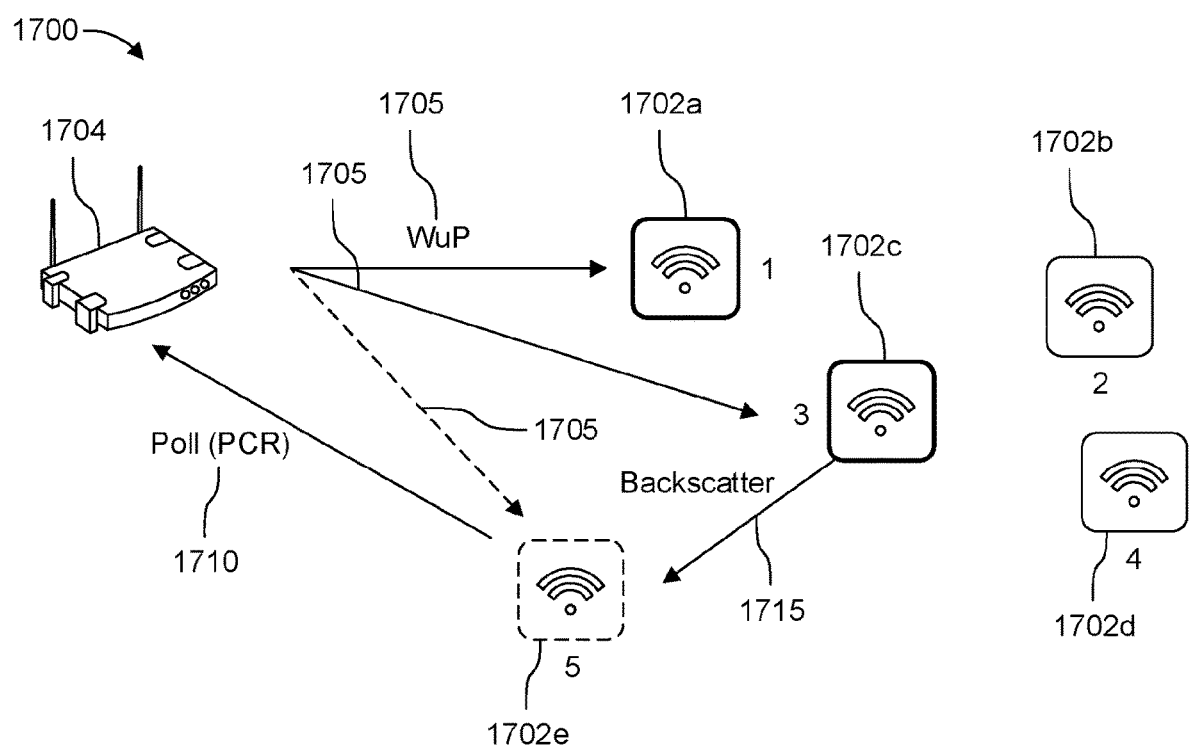
FIG. 17 is a diagram illustrating an example deferred wake-up procedure with a head node backscattering wake-up packet (WuP)

In one embodiment, the group of nodes (e.g., STAs 1-5 1702a-e as illustrated in FIG. 17) may self-determine the wake-up schedule (or common service period for the group of STAs) internally as follows. The ZE devices that make up the network of nodes may all have WuR and PCR components but may not have effective WuR capability to avail support from an AP. For example, the receive sensitivities of the WuR mode and PCR mode can be significantly different in that the link budgets may not be enforceable from the AP to the WuR on some of the ZE devices but is enforceable on the PCR links. This is true regardless of whether the WuR and PCR components are separated components.

To ensure that the WuR of the ZE device receives the wake-up signal, the AP may need to retransmit a few times hoping to increase the probability of reception of the ZE WuR to at least once. However, in this scenario, the ZE WuR cannot close the link due to weak link sensitivity but its PCR can however close the link with the AP. If the network size is large, the page load from the AP will increase and in turn will also increase the overhead on the channel. To emphasize, it is noted that the issue here is not that the link cannot be closed by the ZE receiver (its PCR can) but it is not possible by the WuR component. These are termed partial-WuR devices in text below. To such partial-WuR devices, it is still possible to provide wake-up services by making use of other capable devices within the group that have capability to close the link both on the WuR and from the PCR.

FIG. 17 is a diagram illustrating an example deferred wake-up procedure 1700 with a head node backscattering a wake-up packet (WuP), which may be used in combination with any of other embodiments described herein. It is assumed that STA 1 1702a, STA 21702b, STA 31702c, STA 41702d and STA 51702e may form a group or a cluster. As illustrated in FIG. 17, an AP 1704 may broadcast a wake-up packet 1705 to the group of STAs 1702a-e. The wake-up packet 1705 may be addressed to STA 5 1702e. However, STA 5 1702e may be in less favorable condition than STA 3 1702c to receive the wake-up packet 1705. In one example, STA 5 1702e was initially located close to the AP 1704, but later moved away from the AP 1704 and became a partial WuR STA. In another example, STA 5 1702e may not receive a WuP using its WuR or ZE device, but may communication with the AP using its PCR. During the STA 3's service period, STA 3 1702c may receive the wake-up packet 1705 that is addressed to STA 5 1702e. In this situation, the STA 3 1702c as a head node may transmit or backscatter the wake-up packet 1705 to STA 5 1702e. Once the STA 5 1702e receives, via the WuR or ZE device of the STA 5 1702e, the wake-up packet 1705 transmitted or backscattered from the STA 3 1702c, the STA 5 1702e may wake up its PCR. The STA 5 1702e may then send a poll frame or a response frame to the AP 1704 to indicate that the STA 5 1702e has woke up and ready for communication (e.g., transmission and reception) with the AP 1704.

As illustrated in FIG. 17, to enable the partial WuR ZE devices to enter power save mode and to be woken up when appropriate, the services cannot be directly provided on a link that exists directly between the ZE device and the AP. In this architecture, an alternating head-node can exist within the group that can receive the WuP from the AP and acting on that WuP on behalf of the partial-WuRs that exist in the localized network.

In one example deployment of IoT sensors at an oil rig, the IoT sensors may be spread over a few square kilometers measuring sea levels and propagating readings to an AP controller that is onboard the oil rig. Due to undulating movements of the sea, the IoT sensors may drift around and those that were closer to the oil rig may drift further away. Those that are farther away from the oil rig may drift closer to the oil rig. In such cases, the role of the head-node can change from one that is current to one that was incapable of being a head-node at a prior time period. This is owing to the fact that the drift/physical mobility of the IoT sensors (e.g., STAs) change forcing a currently capable device incapable of closing link with the AP as it drifts apart and instead a different IoT sensor that was previously incapable of closing link with the AP becomes capable. In this use case, the WuR link may be still referred and not necessarily the PCR link. However, it is uncommon for the PCR link also to become unserviceable if the oil rig catchment is several kilometers wide.

The alternating head-node may be a node that has the capability to close the link between itself and the AP. The group formation is as explained in the previous sections. However, in this embodiment, only those nodes that are capable of closing the link with the AP are capable of alternating as head-nodes. Using procedures detailed earlier, the devices that are capable of closing the link participate in alternating schedule and determine the schedule of wake up. The schedule may be self-determined within the group.

The head nodes that participate in the alternating wake-up schedule may previously associate with the AP so that the AP is aware of their presence. The ZE devices that have partial WuR may also register with the APs via the PCR. The AP may assign each associated ZE one or more WuPs (that are unicast or multicast and potentially function specific). Subsequent to the association, the ZE devices with the partial WuR may be woken up only by the local head-node. The ZE devices with partial WuR may indicate to the AP their inability to close link and indicate to the AP their request for enabling WuR functions with the assistance of local nodes.

Figure 18A:
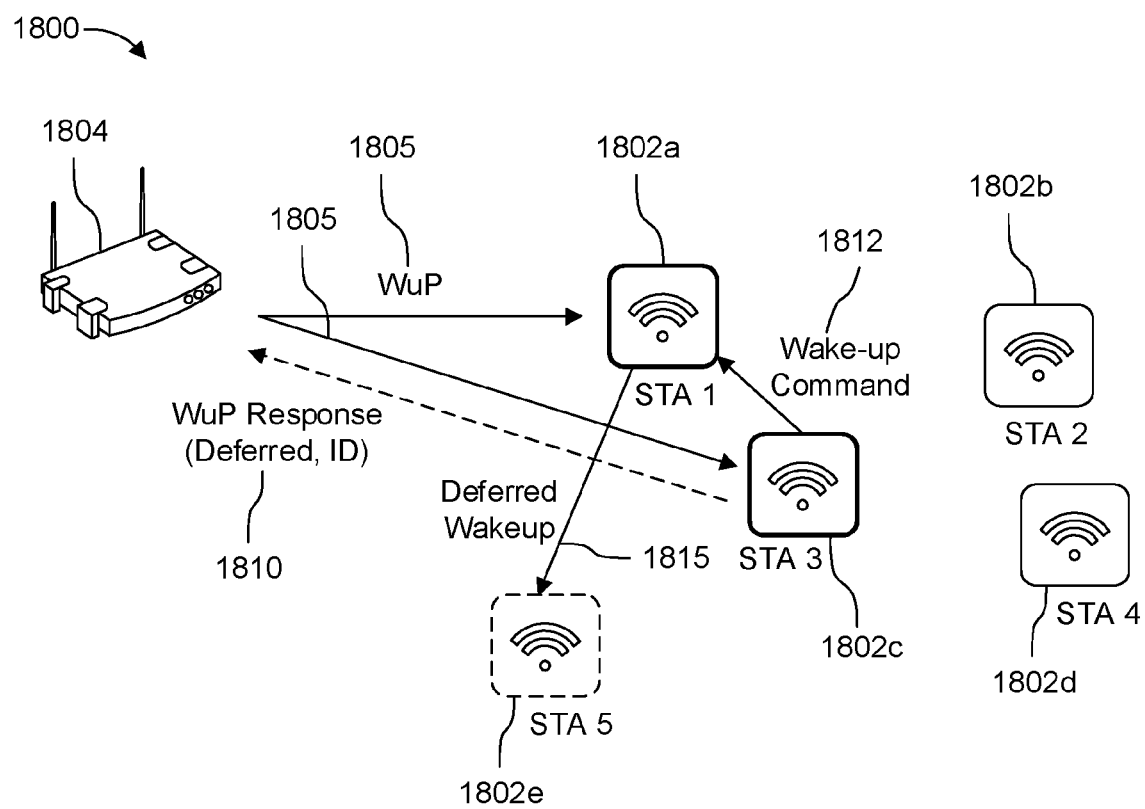
FIG. 18A is a diagram illustrating an example deferred wake-up procedure with a head node responding to an access point (AP) and deferring wake-up packet (WuP) to a ZE node until a later time.

FIG. 18A is a diagram illustrating an example deferred wake-up procedure 1800 with a head node responding to an access point (AP) and deferring wake-up packet (WuP) to a ZE node until a later time, which may be used in combination with any of other embodiments described herein. During the association, the AP may assign one or more wake-up signatures to the nodes in the group. The WuP signature(s) can be individual or group signatures (e.g., hierarchical signatures). The head-nodes, during group formation, may accept service requests from ZE devices with partial WuR and the WuP signatures that have been indicated to them by the AP. The head nodes may add to the schedule of wake-up, WuP meant for partial WuRs. When an AP sends a WuP meant for partial WuRs, the AP may indicate UL transmission opportunities that exist from nearby STAs that the head-nodes could use for backscattering purposes. The head-node that is awake during that time may receive the WuP from the AP, wait until the opportunity for backscattering arises and backscatter the WuP to the partial WuR that exists within the network. Alternatively or additionally, the UL opportunity may be provided by a dedicated signal source nearby supplying the interrogation signal for the head-node to backscatter the WuP to the partial WuRs. The partial WuR may awake after that, wake up its PCR and respond to the AP with a PS POLL. The notion of a head-node and a group setting arises in several use cases, platooning and swarming are two such applications that fit this notion.

In one embodiment illustrated in FIG. 18A, the head node (e.g., STA 1 1802a or STA 3 1082c) may need to defer the delivery of the WuP 1805 to the intended local node (e.g., STA 5 1802e). There are several reasons, but two examples are described herein. One example would be where the intended ZE device (e.g., ZE device of STA 5 1802e) does not have sufficiently harvested energy to receive the WuP 1805 or engage in data transmissions. Another could be that the AP 1804 does not indicate availability of UL opportunities from nearby devices or a dedicated signal source due to high system loading. This may force the head node (e.g., STA 1 1802a or STA 3 1082c) to respond to the AP 1804 of its successful reception of the WuP 1805 and indicate to the AP 1804 the maximum deferral time of WuP forwarding to local node (e.g., STA 5 1802e).

The ZE devices may indicate to the group, periodically, their energy store and an associated metric regarding their ability to participate or resume communications. The ZE devices may also indicate a target resumption time during which they expect to resume communications. The head-node can make use of this target resumption time in estimating when the ZE device will have sufficient energy store and may indicate that to the AP while responding to a WuP. The head-node may also use that estimated time to attempt the deferred delivery.

For a WuP 1805 that is deferred, the AP 1804 and head-node (e.g., STA 1 1802a or STA 3 1082c) may be aware of the deferral time. The AP 1804 at a future time (but before the expiry of deferral period) may indicate to the head-node (e.g., STA 1 1802a or STA 3 1082c) of any new UL opportunities that may exist for backscattering the WuP 1805 to the intended device or the availability of dedicated interrogation signal for backscattering. This may be possible currently compared with earlier time since the network loading condition could have changed. In one embodiment, if the deferral time has reached and no backscattering opportunities has been presented, the head-node may transmit the WuP to the intended target node over sidelink (direct link) using its PCR.

As illustrated in FIG. 18A, a group of STAs may include STA 1 1802a, STA 2 1802b, STA 3 1802c, STA 4 1802d and STA 5 1802e. Among the STAs 1-5 1802a-e in the group, each STA 1802a-e can act as a head node. In this example illustrated in FIG. 18A, STA 1 1802a and STA 3 1802c are assumed to act as a head node during its respective service period (i.e., STA1's 1802a service period and STA 3's 1802c service period). During the formation of the group, STAs 1802a-e (e.g., head node(s)) may determine a common service period for the group of STAs 1802a-e. Alternatively or additionally, the AP 1804 may determine the common service period for the group of STAs 1802a-e before or after the formation of the group and transmit the common service period to the STAs 1802a-e. The common service period may be a collection of service periods for each STA 1802a-e in the group. Specifically, each service period in the collection of service periods may be associated with a respective STA that acts as a head node for communication with the AP 1804 on behalf of other STAs of the group of STAs or for reception of the WuP(s) addressed to any of the STAs 1802a-e in the group. A service period in the common service period may be a time or duration in which a STA can act as a head node for communication with an AP on behalf of other STAs in the group. For example, in FIG. 18A, the common service period comprise a STA 1's service period, a STA 3's service period, a STA 1's service period, a STA 3's service period, and so on. The common service period as well as each service period in the common service period may be determined based on each STA's energy harvesting information. The examples of the energy harvesting information may include, but are not limited to, energy harvesting state, energy harvesting capability, and energy drain rate.

As illustrated in FIG. 18A, the AP 1804 may broadcast the wake-up packet 1805 that is addressed to STA 5 1802e to the STAs 1802a-e during the STA 3's service period. During the STA 3's service period, the ZE device of STA 3 1802c may be turned on to monitor transmission from the AP 1804. Other ZE devices (i.e., STAs 1802a, 1802b, 1802d, 1802e) may be in sleep state or power save mode while the STA 3 1802c acts as a head node in STA 3's service period. Since the ZE device of the STA 3 1802c is awake during the STA 3's service period, the ZE device of STA 3 1802c may receive the wake-up packet 1805 which is addressed to STA 5 1802e. Upon receiving the wake-up packet 1805 addressed to STA 5 1802e, STA 3 1802c may determine that a deferral time associated with STA 5 1802e ends after the STA 3's service period. As described above, a STA (e.g., STA 5 1802e) may defer its wake-up operation, for example, based on the STA's (e.g., STA 5 1802e) energy harvesting capability such as energy harvesting state, energy harvesting capability, and energy drain rate. The deferral time may be determined by a head node (e.g., STA 1 1802a or STA 3 1802c) of the group. The deferral time may be, but not limited to, time, duration, interval, time unit, timing, interframe space and a period of time. The deferral time may indicate when a STA wakes up to receive a wake-up packet or a similar indication from an AP or a head node, and/or when a wake-up packet is forwarded to a STA to which the wake-up packet is addressed. Additionally or alternatively, the deferral time may indicate a period of time between a time when a STA receives a wake-up packet addressed to the other STA and a time when the other STA wakes up to receive the wake-up packet or similar indication from another STA (e.g., another head node in service period).

After STA 3 1802c determines that the deferral time associated with STA 5 1802e ends after the STA 3's service period, the STA 3 1802c may generate a wake-up command 1812 (e.g., chained wake-up command). The wake-up command 1812 may include the wake-up packet 1805 or one or more indications that the wake-up packet 1805 is addressed to the STA 5 1802e. The STA 3 1082c may send, based on the common service period, the wake-up command 1812 to STA 1 1802a that acts as a head node after the STA 3's service period. Alternatively or additionally, upon receiving the wake-up packet 1805 from the AP 1804, STA 3 1802c may transmit, to the AP 1804, a wake-up packet response 1810 that indicates the deferral time of STA 5 1802e and/or the identity of STA 5 1802e. The STA 3 1802c may transmit the wake-up packet response 1810 in order to indicate the AP 1804 that it does not need to retransmit the wake-up packet 1805 to the group. The wake-up packet response 1810 may be transmitted by the PCR of STA 3 1802c or backscattered by the ZE device of STA 3 1802c. Upon receiving the wake-up command 1812 from STA 3 1802c, STA 1 1802a may determine, based on the deferral time and the common service period, that STA 5 1802e wakes up to receive the deferred wake-up packet during the STA 1's service period. After the STA 3's service period expires, STA 1 1802a may send the deferred wake-up packet 1815 to STA 5 1802e. If there is a backscattering opportunity, the ZE device of STA 1 1802a may send the deferred wake-up packet 1815 to STA 5 1802e. If there is no backscattering opportunity, STA 1 1802a may wake up its PCR and use the PCR to transmit the deferred wake-up packet 1815 to STA 5 1802e. It is noted that the wake-up command 1812 may be transmitted from STA 3 1802c to STA 1 1802a during the overlapped service period between the STA 3's service period and the STA 1's service period. The wake-up command 1812 may be backscattered by a ZE device of STA 3 1802c. Alternatively or additionally, the wake-up command 1812 may be transmitted or backscattered to one or more STAs.

Figure 18B:
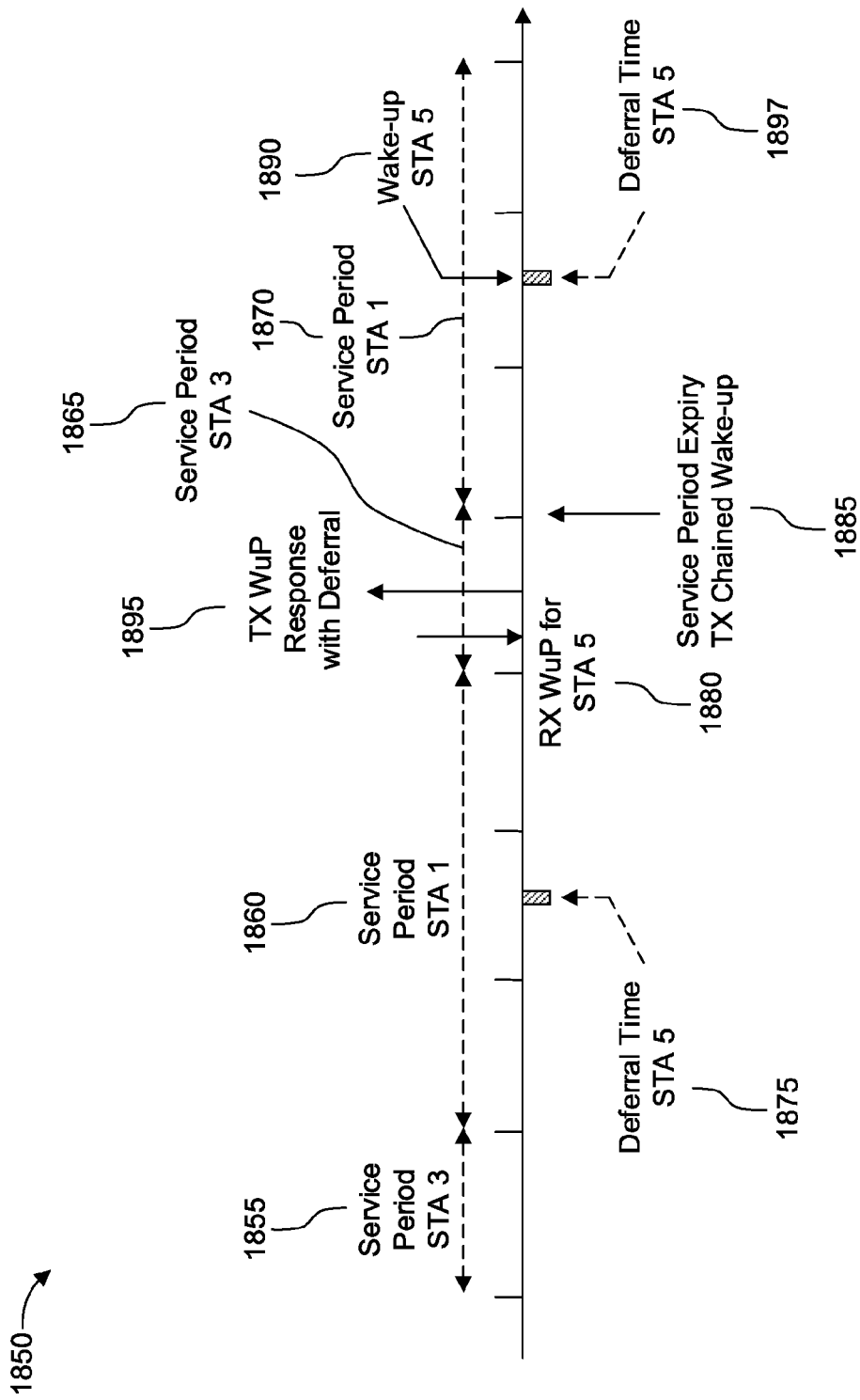
FIG. 18B is a diagram illustrating an example timeline for a deferred wake-up procedure.

FIG. 18B is a diagram illustrating an example timeline 1850 for a deferred wake-up procedure, which may be used in combination with any of other embodiments described herein. As illustrated in FIG. 18B, in a group comprising STAs 1-5, STA 1 and STA 3 may act as a head node during its respective service period. A service period may be a time or duration in which a STA can act as a head node for communication with an AP on behalf of other STAs in the group. The service period for each STA in the group may be determined based on each STA's energy harvesting information such as energy harvesting state, energy harvesting capability, and energy drain rate. As illustrated in FIG. 18B, the service period of STA 1 1860 is longer than the service period of STA 3 1855. This may mean that the energy harvesting capability of STA 1 is larger than the energy harvesting capability of STA 3. For example, if both STA 1 and STA3 are using RF signals for the energy harvesting, the STA 1 may be located closer to the AP than the STA 3, thereby STA 1 harvesting the energy at higher rates than the STA 3.

As described above, a STA in a group may defer its wake-up or wake-up time to the service period of any STA over different common service period, for example, based on the STA's energy harvesting capability. As illustrated in FIG. 18B, STA 5 may defer its wake-up time (i.e., deferral time 1875, 1897) to the STA 1's service period 1860, 1870. Although it is not illustrated in FIG. 18B, the STA 5 ay defer its wake-up time to the STA 3 service period. The deferral time 1875, 1897 may be determined based on the STA's energy harvesting capability such as energy harvesting state, energy harvesting capability, and energy drain rate. For example, in FIG. 18B, the head node such as STA 1 and STA 3 may determine STA 5's deferral time 1897 based on the STA 5's initial energy harvesting capability. The deferral time may be, but not limited to, time, duration, interval, time unit, timing, interframe space and a period of time. The deferral time may indicate when the STA wakes up to receive a wake-up packet or a similar indication from an AP or a head node, and/or when the wake-up packet is forwarded to a STA to which the wake-up packet is addressed. Additionally or alternatively, the deferral time 1875, 1897 may indicate a period of time between a time when a STA receives the wake-up packet addressed to the other STA and a time when the other STA wakes up to receive the wake-up packet or similar indication from another STA (e.g., a head node in service period). For example, in FIG. 18B, the STA 5's deferral time 1897 can be a period of time between a time 1880 when STA 3 receives a wake-up packet addressed to STA 5 during the STA 3's service period 1865 and a time 1897 when STA 5 wakes up to receive the wake-up packet addressed to the STA 5 during the STA 1's service period 1870.

During the service periods 1855, 1860, 1865, 1870, STAs (i.e., head node STAs 1 and 3) may turn on WuRs or ZE devices to receive a wake-up packet 1880 from the AP. If the STAs need to respond to the AP, the STAs may turn on PCRs, for example, to transmit a wake-up packet response 1895 frame to the AP. As illustrated in FIG. 18B, the AP transmits (i.e., broadcast, groupcast or multicast) a wake-up packet 1880 addressed to STA 5 to the group of STAs. Since the STA 3 is in the service period 1865 in which the STA 3 acts as a head node on behalf of other STAs in the group, the STA 3 may receive the wake-up packet 1880 addressed to STA 5. The STA 5 may in sleep state or power save mode when the wake-up packet 1880 is received at the STA 3. Upon receiving the wake-up packet 1880 addressed to STA 5, STA 3 may determine that the deferral time 1897 associated with STA 5 ends after the STA 3's service period 1865. The STA 3 may generate a wake-up command 1885 (e.g., chained wake-up command) that includes the wake-up packet 1880 or one or more indications of the wake-up packet 1880 addressed to STA 5. The STA 3 may then send the wake-up command 1885 to STA 1 that acts as a head node on behalf of other STAs after the STA 3's service period 1865. Alternatively or additionally, upon receiving the wake-up packet 1880 from the AP during the STA 3's service period 1865, STA 3 may transmit, to the AP, a wake-up packet response 1895 that indicates the deferral time of STA 5 and/or the identity of STA 5. The wake-up packet response 1895 may indicate the AP that the AP does not need to retransmit the wake-up packet 1880 to the STA 5 or the group. The wake-up packet response 1895 may be transmitted by the PCR of STA 3 or backscattered by the ZE device of STA 3. Upon receiving the wake-up command from STA 3, STA 1 may determine, based on the deferral time, when STA 5 wakes up to receive the wake-up command or the deferred wake-up packet. STA 1 may then transmit (or backscatter) the wake-up command or deferred wake-up packet to STA 5 after the STA 5 wakes up at 1890. If there is a backscattering opportunity, the ZE device of STA 1 may send the wake-up command or deferred wake-up packet to STA 5. If there is no backscattering opportunity, STA 1 may wake up its PCR and use the PCR to transmit the wake-up command or deferred wake-up packet to STA 5.

Although it is not illustrated in FIG. 18B, the wake-up command 1885 may be transmitted to STA 1 during a time when the STA 3's service period 1865 overlaps in time with the STA 1's service period 1870. The wake-up command 1885 may be backscattered by a ZE device of STA 3 to the STA 1. In one embodiment, the wake-up command may be transmitted or backscattered to one or more STAs in the group.

Figure 19:
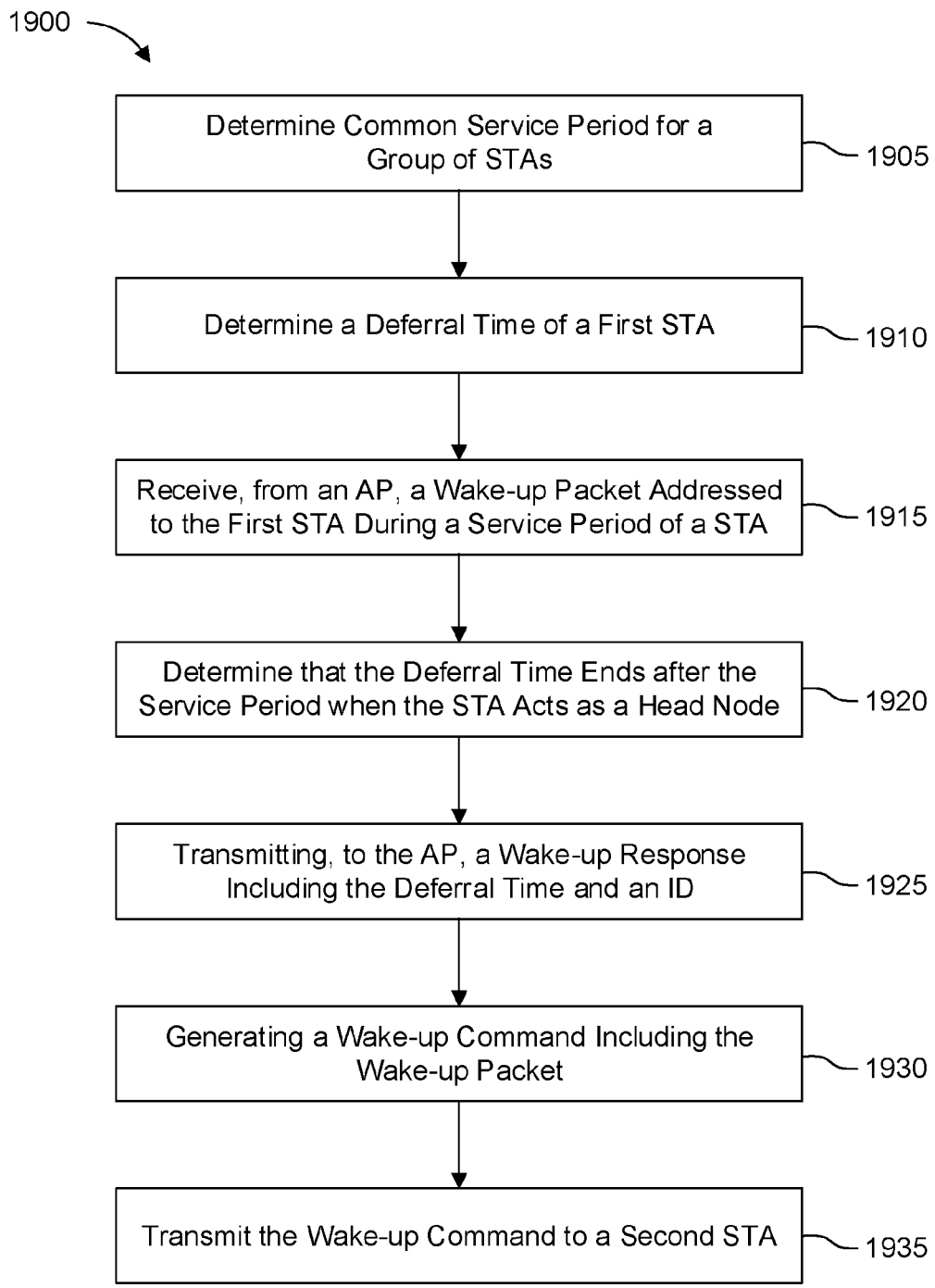
FIG. 19 is a diagram illustrating an example deferred wake-up procedure with a deferral time.

FIG. 19 is a diagram illustrating an example deferred wake-up procedure 1900 with a deferral time, which may be used in combination with any of other embodiments described herein. At step 1905, a STA (e.g., head node of a group of STAs) may determine, at the formation of the group of STAs, a common service period for the group of STAs. The common service period may be a collection of service periods. Each service period in the collection of service periods may be associated with a respective STA that acts as a head node for communication with the AP on behalf of other STAs of the group of STAs. For example, the common service period may be a repeated, sequential order of service periods of STA 1, STA 2 and STA 3 as illustrated in FIG. 11. In another example, the common service period may be a sequential order of service periods of WuR 1, WuR 2, WuR 3, WuR 4, WuR 5 and WuR 6 as illustrated in FIG. 12. Service periods of the common service period may overlap in time each other as illustrated in FIG. 11. For example, a first service period of the common service period may overlap in time with a second service period of the common service period. The common service period for the group of STAs and/or each service period in the common service period may be determined based on energy harvesting information of the STA(s) such as energy harvesting state, energy harvesting capability, and energy drain rate.

At step 1910, the STA may determine one or more deferral times for one or more STAs (e.g., a deferral time for a first STA) of the group of STAs. The deferral time may be any time period, duration, timing, interval or the like. For example, the deferral time may indicate when the first STA wakes up to receive a wake-up packet or when the wake-up packet is forwarded to the second STA. The deferral time may be a period of time between a time when the STA receives the wake-up packet addressed to the first STA and a time when the first STA wakes up to receive the wake-up packet. The STA may determine the deferral time based on energy harvesting information of the first STA (i.e., the STA to which its wake-up is deferred), such as energy harvesting state, energy harvesting capability, energy drain rate or the like.

At step 1915, the STA may receive, from the AP, during the service period when the STA acts as a head node for communication with the AP on behalf of other STAs of the group of STAs, a wake-up packet addressed to the first STA. At step 1920, the STA may determine that the deferral time associated with the wake-up packet addressed to the first STA ends after the service period in which the STA acts as a head node. In response to the wake-up packet, optionally or additionally, at step 1925, the STA may send a wake-up packet response that indicates the deferral time and/or an identity of the first STA, to enable the AP to not retransmit the wake-up packet. At step 1930, the STA may generate a wake-up command or a chained wake-up command that includes one or more indications indicating the wake-up packet addressed to the first STA. At step 1935, the STA may transmit or backscatter, to a second STA of the group of STAs, a wake-up command. The wake-up command or chained wake-up command may be transmitted or backscattered, based on the common service period, to the second STA, to enable the second STA to deliver the wake-up packet to the first STA at or after the deferral time. Upon receiving the wake-up command, the second STA may transmit or backscatter, based on the deferral time and/or the common service period, the wake-up packet or any packet or frame indicating that the wake-up packet is addressed to the first STA or that the first STA needs to wake up for further communication with the AP.

The text above can be embodied as below. A rotational head node ZE WuR may receive WuPs from a WuR AP and indications of opportunistic UL. The head node may determine the start of its wake-time and if its wake-up slot is head-of-line. The head node may become a head node once it enters wake-up cycle. The head node may receive a WuP from the AP and determine the ZE WuR to be woken up. The head node may determine time opportunity to backscatter the WuP to the ZE WuR. The head node may backscatter the WuP at the occurrence of an opportunistic UL by another member. Alternatively or additionally, The head node may determine that WuP cannot be consumed currently by the intended ZE WuR; responding to the AP of WuP reception plus a deferral time period. The use of sidelink (e.g., direct link) may be forced if deferral time is reached and no backscattering opportunity. The head node may determine that its watch-period is about to end; creating a head-of-line signal and transmitting a chained WuP for a delta-duration ahead of end of watch-period for one or more occasions. The head node may include an identity mask if a multicast payload is part of chained payload and prevent repeated forwarding.

If the head-node enters its own sleep cycle prior to the deferral time, it may chain the WuP commands pending for ZE devices and pass it on to the next head-node at the time of entering sleep cycle. Those sequences are described earlier as part of FIG. 12.

Embodiments for undirected graphs are described herein.

Figure 20:
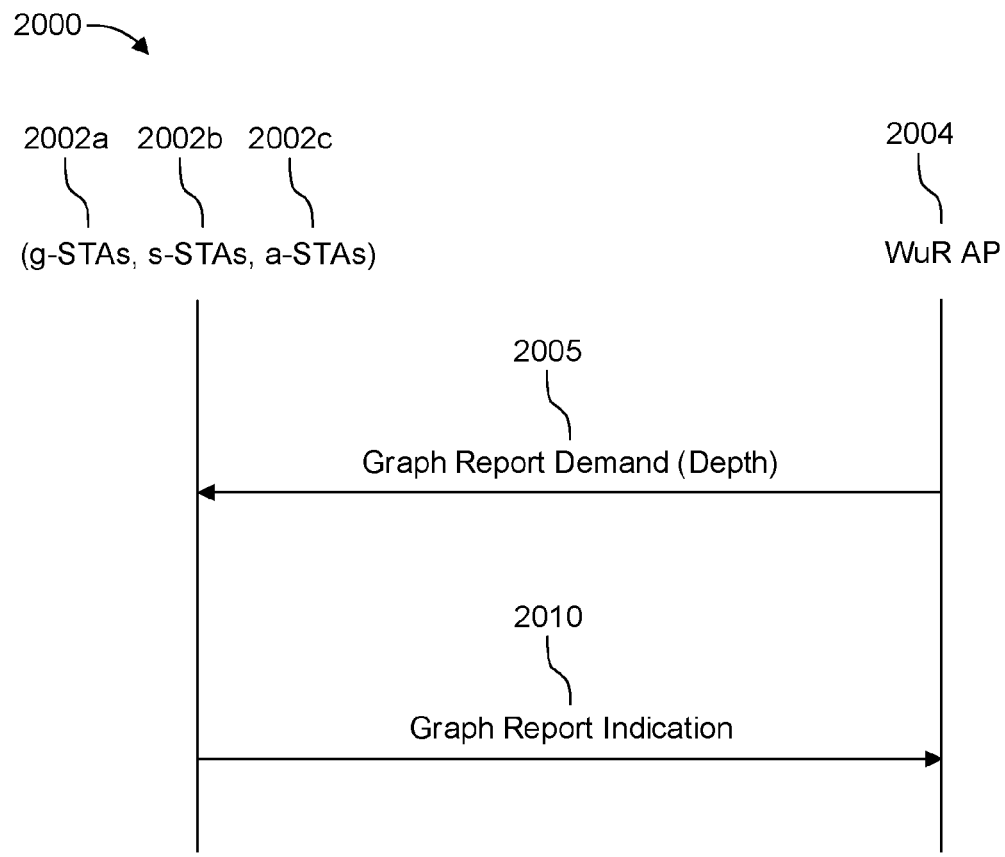
FIG. 20 is a diagram illustrating an example graph reporting procedure.

FIG. 20 is a diagram illustrating an example graph reporting 2000, which may be used in combination with any of other embodiments described herein. As illustrated in FIG. 20, a WuR AP (or ZE-WUR AP) 2004 may send a graph report demand 2005 to one or more STAs such as g-STAs 2002a, s-STAs 2002b, and a-STAs 2002c. The ZE-WuR AP 2004 can demand measurement reports that include neighbor relation from any STA (e.g., g-STAs 2002a, s-STAs 2002b, and a-STAs 2002c) using a graph report demand primitive 2005. The information depth of neighbor relation may be specified in the argument of the demand primitive 2005. For example, a depth of 2 may indicate that the ZE-WuR AP 2004 is looking for directly measurable neighboring node information (e.g., 1$^{st}$ level neighbors) as well as the immediately neighboring nodes of the 1$^{st}$ level neighboring nodes. The measurements may include RSSI, SNR, or the like among additional information such as load, frequency of transmission, perceived percentage occupancy of channel etc. The ZE-WuR AP 2004 may collect and maintain measurements including counter values of wake-up attempts per STA, wake-up success rates per STA, wake-up latencies per STA, false wake-up rates per STA, missed wake-up rates per STA, or the like.

The ZE-WuR AP 2004 as well as STAs (e.g., g-STAs 2002a, s-STAs 2002b, and a-STAs 2002c) that include measurement information of other STAs in the neighborhood can determine the topology of existence. An edge is deemed to exist between two STAs is they are 1$^{st}$ level neighbors (i.e., at least one can hear the other). The resulting graph maybe undirected in that, it is enough for one node to hear the other because only a reception may have been so far. While channel reciprocity may not always exist, it is usually true that if one node can hear another node on a channel when transmission occurred at a specific power P, transmission in the reverse direction will likely be heard as well if the roles were reversed. The STAs (e.g., g-STAs 2002a, s-STAs 2002b, and a-STAs 2002c) may also be able to hear STAs on other channels serviced by other ZE WuR APs including the ZE WUR AP 2004. If the STA measured another node and that node is co-channel, a grade 1 edge is deemed to exist. If the STA measured another node and the node is on a different channel, a grade 2 edge is deemed to exist.

In response to the graph report demand 2005 received from the ZE WUR AP 2004, the STAs (e.g., g-STAs 2002a, s-STAs 2002b, and a-STAs 2002c) may send a graph report indication 2010 to the ZE WUR AP 2004. Specifically, the STAs may report the RSSI, perceived pathloss to a neighbor node and SNR as part of the graph report indication 2010. The long term pathloss can be approximately converted to a distance assuming an appropriate pathloss exponent for the deployment.

Figure 21:
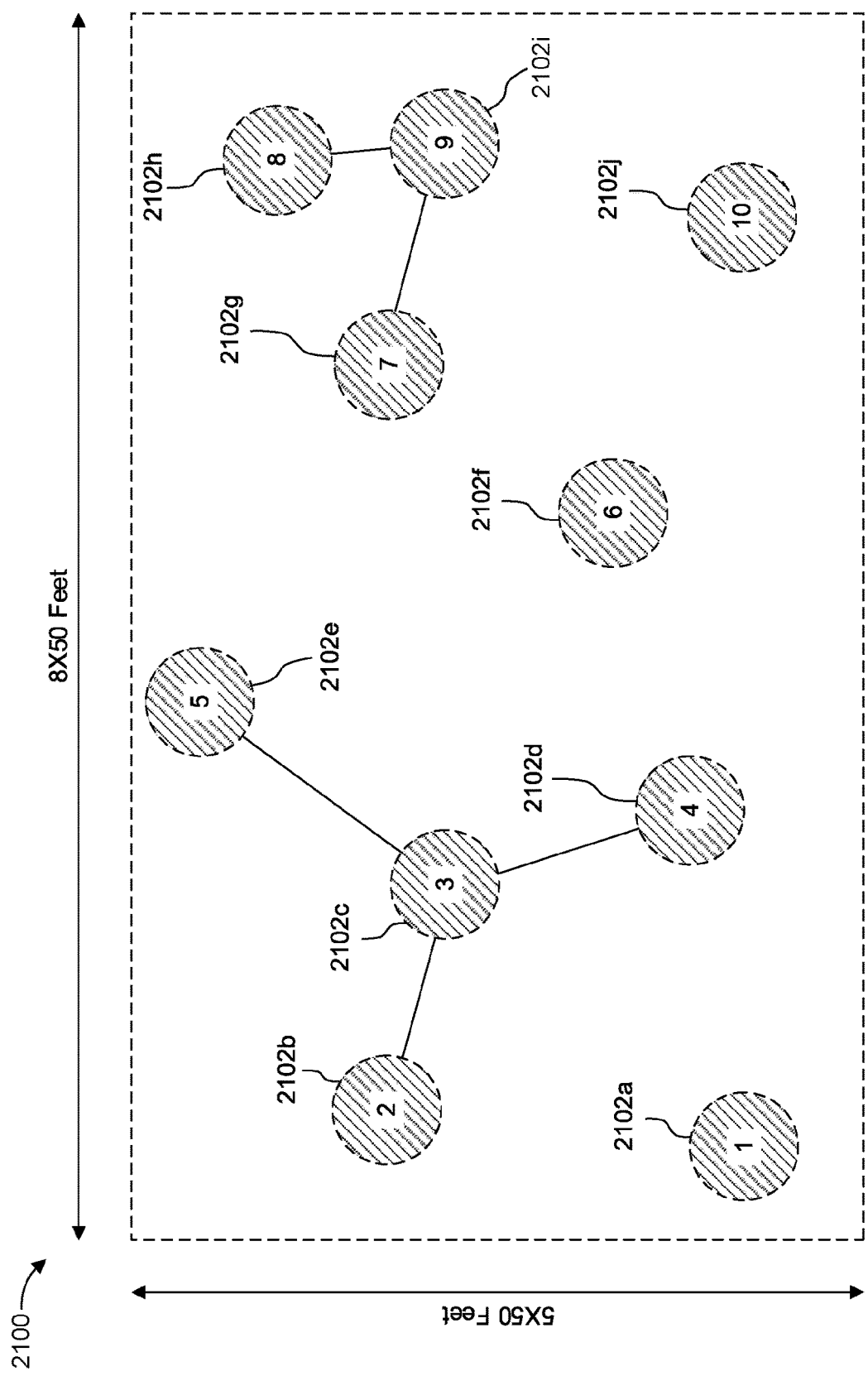
FIG. 21 is a diagram illustrating an example edge determination for enabling group communications.

FIG. 21 is a diagram illustrating example edge determination 2100 for enabling group communications, which may be used in combination with any of other embodiments described herein. FIG. 21 shows a group of 10 STAs 2102a-j and the grade 1 edge between some of them. This comprehensive view of the topology may be made by either the ZE-WuR AP and/or the STAs 2102a-j themselves based on measurement report interception. In FIG. 21, STA 3 2012c may be able to measure a transmission from STA 2 2012b, STA 4 2012d and STA 5 2102e. Similarly, STA 9 2012i may be able to measure STA 7 2012g and STA 9 2102i. Islands of STA 1 2102a, STA 6 2102f and STA 10 2012j may be present in the topology either because: (1) they are never heard over the radio channel; or (2) they are heard well below a threshold sufficient for receiver sensitivity. In such scenario, if STA 1 2102a, STA 6 2102f and STA 10 2012j are a-STAs, they may require increased transmission power from the nearest nodes (e.g., STA 4 2102d and STA 7 2102g) to provide proxy or surrogate services. In some scenarios, the ZE-WuR AP may determine that a redundant schema for transmission involving more than 2 STAs (e.g., involving STA 4 2102d and STA 7 2102g) to reach or provide services to STA 1 2102a, STA 6 2102f and STA 10 2102j. The ZE-WuR AP can make such determination by computing cost of enabling redundant transmission, capability of STA 4 2102d and STA 7 2102g, etc.

Figure 22:
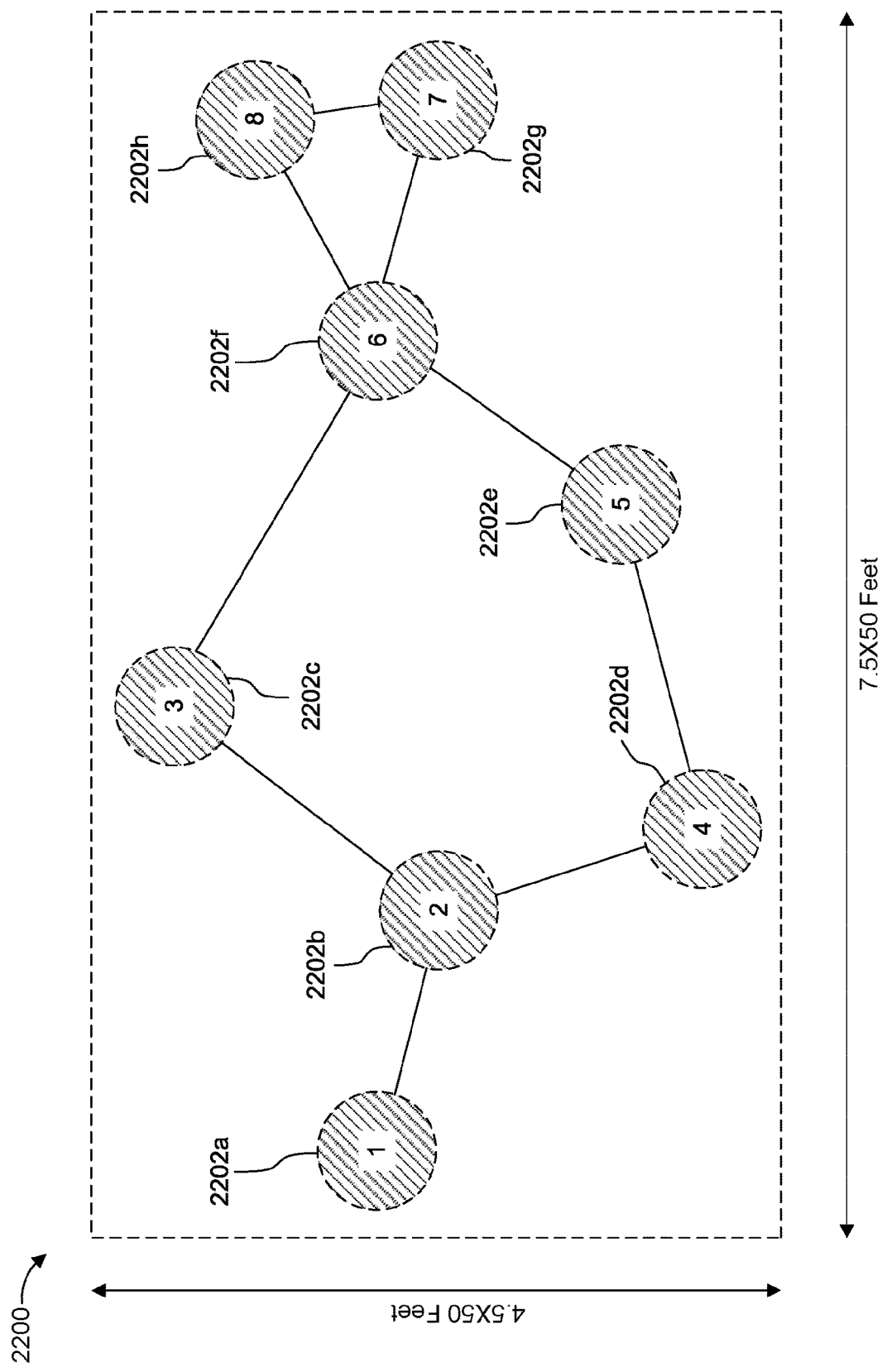
FIG. 22 is a diagram illustrating an example full mesh, edge determination for enabling group communications.

FIG. 22 is a diagram illustrating an example full mesh, edge determination 2200 for enabling group communications. In a complimenting example to FIG. 21, FIG. 22 shows a full mesh where all the nodes or STAs 1-7 2102a-g in a deployment are somehow comprehensively connected to each other logically. Thus, it is possible to reach any node or STA in that topology from the ZE-WuR AP, even the furthest a-STA that is not directly reachable, using more than one possible path. For example, a link from STA 1 2102*a* to STA 7 2102*g* may exists either via STA 3 2102*c* or STA 4 2102*d*.

Figure 23:
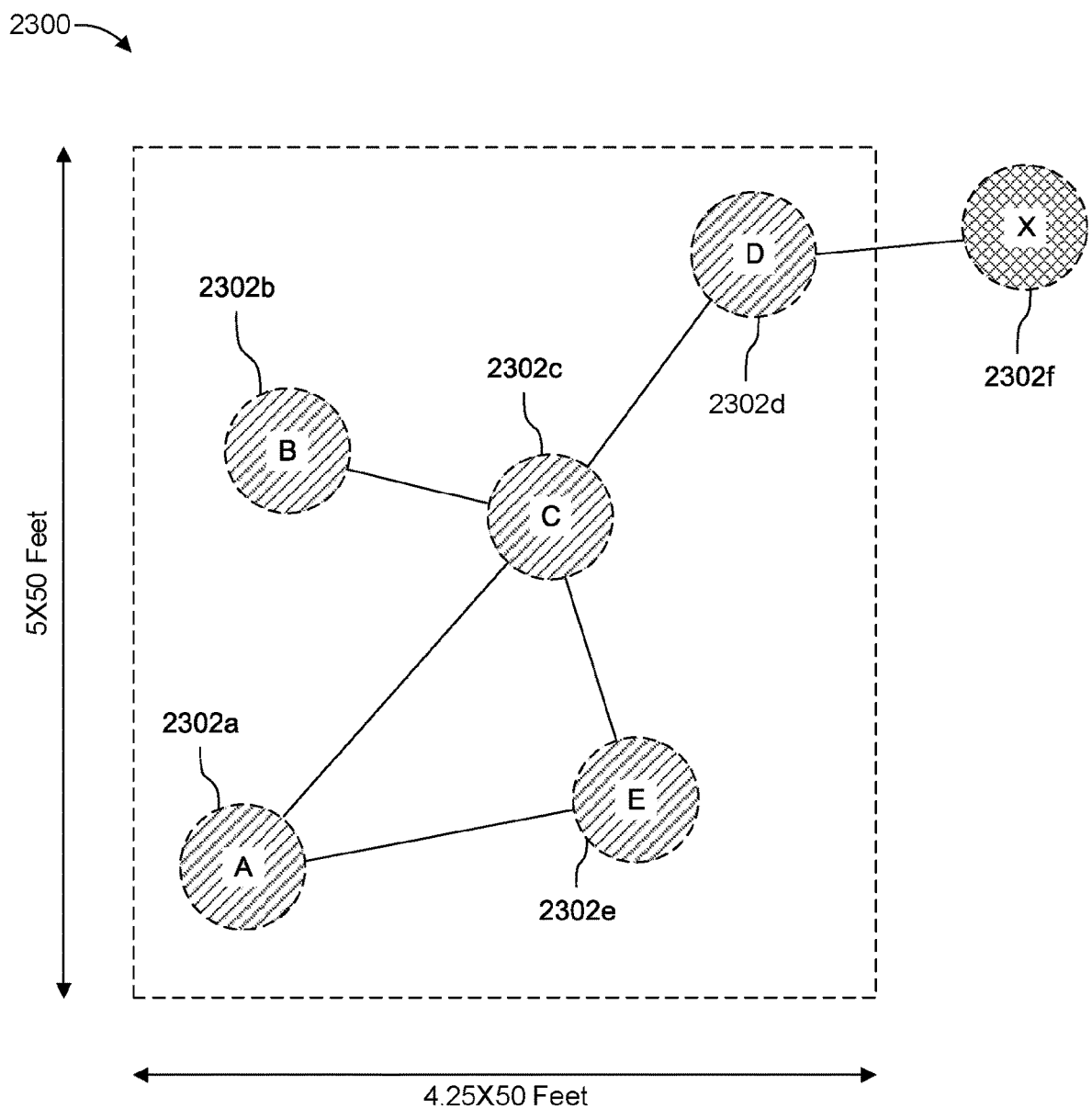
FIG. 23 is a diagram illustrating example foreign node detection during edge determination for enabling group communications.

FIG. 23 is a diagram illustrating example foreign node detection 2300 during edge determination for enabling group communications, which may be used in combination with any of other embodiments described herein. FIG. 23 shows STA X 2302*f* that is on a different channel to STAs A-E 2302*a-e*. STA D 2302*d* may coincidentally monitor activity of STA X 2302*f* when it senses for information on the channel used by STA X 2302*f*. In such example, in cases of emergent transmissions, a ZE-WuR AP may command STA D 2302*d* to transmit a WuP on a different channel, the channel used by STA X 2302*f* in order to transmit an important payload.

A ZE-WuR AP and ZE-WuR STAs can determine an undirected graph set by overhearing transmissions on one or more channels (primary and other). In one embodiment, when a ZE-WuR AP estimates that the wake-up success rate to one or more of the a-STAs/s-STAs/g-STAs has not met a success threshold, the ZE-WuR AP may transmit a GRAPH REPORT DEMAND primitive to all ZE-WuR STAs. The STAs may report a GRAPH REPORT INDICATION on such demand comprising the depth level demanded. The STAs may also autonomously transmit the GRAPH REPORTs to the ZE-WuR AP during reassociation, wake-up mode renegotiations, etc. The measurements may comprise pilot received power measurements of other APs, long term mean pathloss (PL) estimate to each neighboring STA among others. The ZE-WuR AP may group STAs into separate clusters based on PL histogram it maintains. In one embodiment, if PL to STAi is >THR[X dB], STAi is marked for sensitive WuS[X]. In another embodiment, if SINR at STAi is <=THR[X dB], STAi is marked for sensitive WuS [Y].

In one embodiment, the ZE-WuR AP may configure each STA that associated with it a group discovery sequence and a group discovery time offset. Based on geography, the ZE-WuR AP may configure each STA in group of S STAs a zero-correlation short sequence to be transmitted by each STA and inform the remaining [S−1] STAs to listen to that sequence giving a timetable. The timetable may be configured as an offset in that STA 1 transmits the sequence at its specified time offset when the remaining (S−1) STAs are aligned to measure at the same time offset. A round-robin mechanism may then be employed with specific periodicity giving each STA in the group of S an opportunity to transmit and remaining [S−1] STAs to listen where each STA's transmit time offset does not overlap with the transmit time offset of the remaining (S−1) STAs. The AP may collect results and form an undirected graph of which STA can be heard by which STAs. The AP may use this undirected graph to form RF topology and create a multi-hop routing table. The AP may maintain designated STAs per STA. The most disadvantaged ZE-WuR-STAs may be reached both directly by the AP as well as via forwarding of WuP by designated STAs within S.

Figure 24:
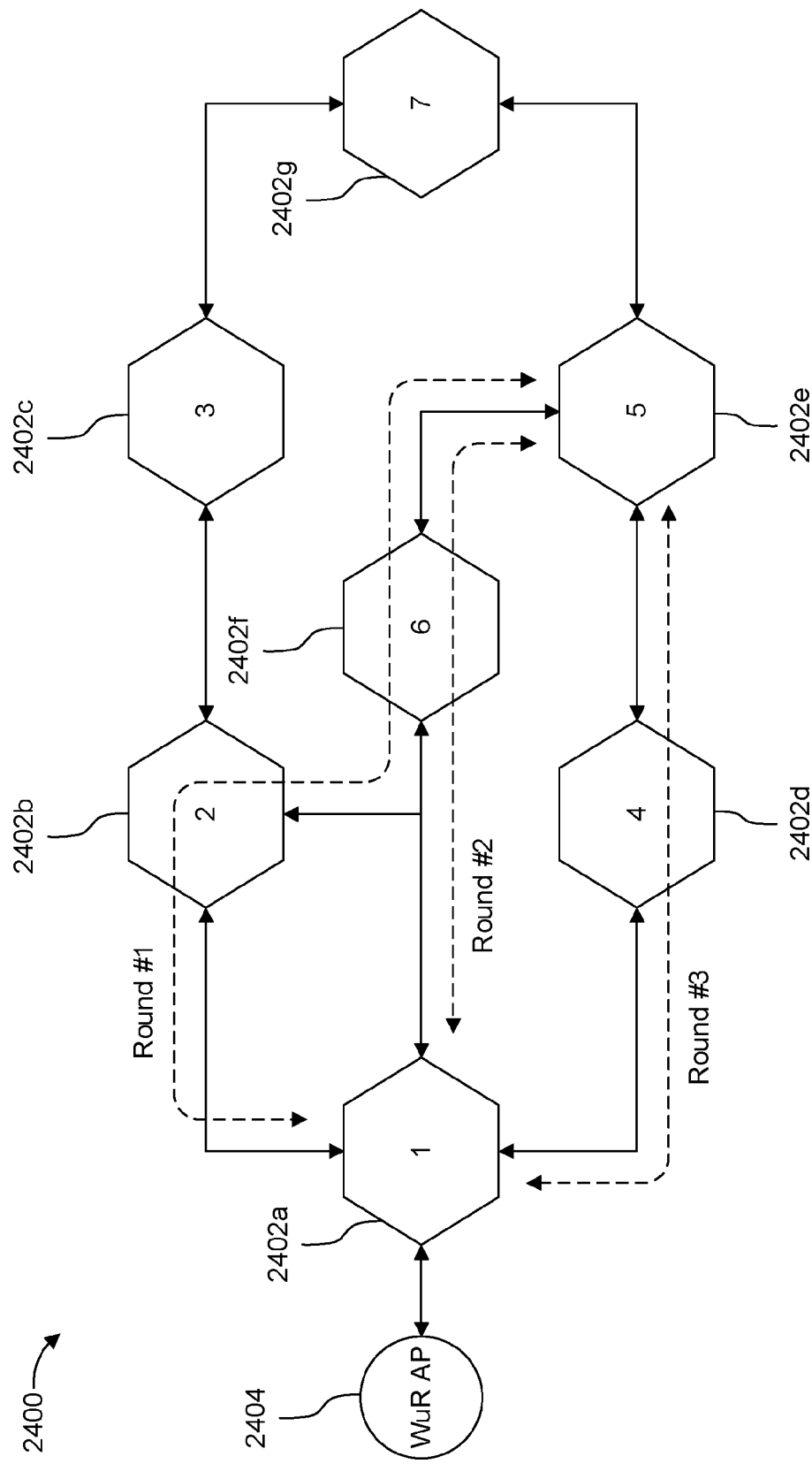
FIG. 24 is a diagram illustrating an example wake-up packet (WuP) signaling path.

FIG. 24 is a diagram illustrating an example WuP signaling path 2400, which may be used in combination with any of other embodiments described herein. FIG. 24 shows the possible paths for waking up a-STA #5 2402*e*. In this scenario, STA #1 2402*a* is a gateway STA (g-STA), and STA #4 2402*d*, STA #6 2402*f* and STA #2 2402*b* are surrogate STAs (s-STA). To reach a-STA #5 2402*e*, a ZE-WuR AP 2404 may signal a communal signature to g-STA #1 2402*a*. The g-STA #1 2402*a* may determine the path that it should choose based on cost of transmission to STA #2 2402*b*, STA #4 2402*d* and STA #6 2402*f*. For example, STA #4 2402*d* may be the logical path, but STA #4 2402*d* may be a lower capability STA. STA #1 2402*a* may choose to use STA #2 2402*b* and hierarchically embeds the WuP signature such that ZE-WuR STA #4 2402*d* and ZE-WuR STA #6 2402*f* do not wake up and ignore the communal signature. If reliability was important and the message priority is high, the g-STA may transmit the WuP signature via s-STA #4 2402*d*. In one embodiment, if the primary component radio (PCR) of a ZE-WuR STA needs be woken up, the STA's transmission can facilitate backscattering principles.

The text above can be embodied as below. A STA may opportunistically peer into transmissions from neighboring STAs. A ZE WuR AP may configure orthogonal time offset on each STA to transmit sequence periodically. The STAs may estimate measurements such as RSSI, SNR, SINR, symbol power, congestion level, typical TXOPs, mean delay in access and pathloss of each neighboring STA on one or more frequencies. The STAs may create a neighbor list based on measurements peered from other STAs. A STA may broadcast periodically or on demand the neighbor list on each carrier frequency it supports. The STAs may determine an undirected graph between itself and all $N^{th}$ level neighbors. The ZE WuR AP may command STAs to report undirect graph periodically. The ZE WuR AP may determine RF topology using undirect graphs. The ZE WuR AP may determine ideal forwarding paths to each a-STA based on number of hops. The ZE WuR AP may determine ideal forwarding paths to each a-STA based on intermediate link strengths, congestion levels, etc. The ZE WuR AP may determine ideal forwarding paths to each a-STA based on number of hops and/or intermediate link strength and/or congestion levels. A ZE WuR AP may choose most optimal path to forward WuPs.

Embodiments for priority-based automatic uplink (UL) slots are described herein.

The g-STA and/or s-STA that provide surrogate/proxy functions to the a-STA may configure automatic UL slots for transmission following a successful wake-up of the a-STA. In one embodiment, during the solicitation process, the s-STA or g-STA may configure an automatic uplink slot for the a-STA to transmit after a wake-up, a fixed offset and a window since wake-up. The length of the window may depend on the priority of the wake-up signature (i.e., service priority) and/or the priority as well as capability of the a-STA. In a related embodiment, the automatic UL slots may be configured in the solicit command from the s-STA/g-STA at the a-STA. The offset of the UL slot transmission and length of the window are directly proportional to the service priority. Thus, if the a-STA is serviced by more than one concurrent s-STA or g-STA, two independent WuP signatures from two g-STAs/s-STAs may not result in conflicting uplink transmission slot opportunities.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method for use in a station (STA), the method comprising: receiving, from an access point (AP), during a service period in which the STA acts as a head node for communication with the AP on behalf of other STAs of a group of STAs, a wake-up packet addressed to a first STA of the group of STAs;
transmitting, to a second STA, different from the first STA, of the group of STAs, a wake-up command that includes the wake-up packet addressed to the first STA, wherein the wake-up command is transmitted to the second STA based on a determination, by the STA, that a deferral time associated with the wake-up packet addressed to the first STA ends after the service period in which the STA acts as a head node.

2. The method of claim 1, wherein the deferral time indicates when the wake-up packet is forwarded to the second STA or a period of time between a time when the STA receives the wake-up packet addressed to the first STA and a time when the first STA wakes up to receive the wake-up packet.

3. The method of claim 1, wherein the deferral time is determined by the STA based on energy harvesting information of the first STA, the energy harvesting information comprising energy harvesting state, energy harvesting capability, and energy drain rate.

4. The method of claim 1, further comprising: determining, at formation of the group of STAs, a common service period for the group of STAs, wherein the common service period is a collection of service periods and each service period in the collection of service periods is associated with a respective STA that acts as a head node for communication with the AP on behalf of other STAs of the group of STAs.

5. The method of claim 4, wherein the common service period for the group of STAs includes the service period of the STA that is determined based on energy harvesting information of the STA.

6. The method of claim 4, wherein a first service period of the common service period overlaps in time with a second service period of the common service period.

7. The method of claim 6, wherein the wake-up command is transmitted to the second STA during a time when the first service period overlaps in time with the second service period.

8. The method of claim 4, wherein the wake-up command is transmitted, based on the common service period, to the second STA, to enable the second STA to deliver the wake-up packet to the first STA at or after the deferral time.

9. The method of claim 1, wherein the wake-up command includes one or more indications of wake-up packets that are addressed to one or more STAs of the group of STAs, and wherein the wake-up command is backscattered by a zero energy (ZE) device of the second STA.

10. The method of claim 1, further comprising: transmitting, to the AP, in response to the wake-up packet, a wake-up packet response indicating the deferral time and an identity of the first STA, to enable the AP to not retransmit the wake-up packet.

11. A station (STA) comprising:
a processor; at least one transmitter; and at least one receiver, the processor and the at least one receiver configured to receive, from an access point (AP), during a service period in which the STA acts as a head node for communication with the AP on behalf of other STAs of a group of STAs, a wake-up packet addressed to a first STA of the group of STAs; and
the processor and the at least one transmitter configured to transmit, to a second STA, different from the first STA, of the group of STAs, a wake-up command that includes the wake-up packet addressed to the first STA, wherein the wake-up command is transmitted to the second STA based on a determination, by the STA, that a deferral time associated with the wake-up packet addressed to the first STA ends after the service period.

12. The STA of claim 11, wherein the deferral time indicates when the wake-up packet is forwarded to the second STA or a period of time between a time when the STA receives the wake-up packet addressed to the first STA and a time when the first STA wakes up to receive the wake-up packet.

13. The STA of claim 11, wherein the deferral time is determined by the STA based on energy harvesting information of the first STA, the energy harvesting information comprising energy harvesting state, energy harvesting capability, and energy drain rate.

14. The STA of claim 11, wherein the processor is further configured to determine, at formation of the group of STAs, a common service period for the group of STAs, wherein the common service period is a collection of service periods and each service period in the collection of service periods is associated with a respective STA that acts as a head node for communication with the AP on behalf of other STAs of the group of STAs.

15. The STA of claim 14, wherein the common service period for the group of STAs includes the service period of the STA that is determined based on energy harvesting information of the STA.

16. The STA of claim 14, wherein a first service period of the common service period overlaps in time with a second service period of the common service period.

17. The STA of claim 16, wherein the wake-up command is transmitted to the second STA during a time when the first service period overlaps in time with the second service period.

18. The STA of claim 14, wherein the wake-up command is transmitted, based on the common service period, to the second STA, to enable the second STA to deliver the wake-up packet to the first STA at or after the deferral time.

19. The STA of claim 11, wherein the wake-up command includes one or more indications of wake-up packets that are addressed to one or more STAs of the group of STAs, and wherein the wake-up command is backscattered by a zero energy (ZE) device of the second STA.

20. The STA of claim 11, wherein the processor and the at least one transmitter are further configured to transmit, to the AP, in response to the wake-up packet, a wake-up packet response indicating the deferral time and an identity of the first STA, to enable the AP to not retransmit the wake-up packet.

* * * * *